(12) United States Patent
Morita

(10) Patent No.: US 6,611,285 B1
(45) Date of Patent: *Aug. 26, 2003

(54) METHOD, APPARATUS, AND SYSTEM FOR CONTROLLING A CAMERA, AND A STORAGE MEDIUM STORING A PROGRAM USED WITH THE METHOD, APPARATUS AND/OR SYSTEM

(75) Inventor: Kenji Morita, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/895,266

(22) Filed: Jul. 16, 1997

(30) Foreign Application Priority Data

Jul. 22, 1996 (JP) .............................................. 8-192594
Nov. 29, 1996 (JP) .............................................. 8-319897

(51) Int. Cl.[7] .............................................. H04N 5/232
(52) U.S. Cl. ................. 348/211.3; 348/14.03
(58) Field of Search .......................... 348/15, 211, 213, 348/333, 334, 358, 240, 14.1, 211.99, 211.3, 211.1, 233.01, 233.02, 233.03, 357, 239; H04N 7/15

(56) References Cited

U.S. PATENT DOCUMENTS

| | | | |
|---|---|---|---|
| 4,516,156 A | * 5/1985 | Fabris et al. ................... 348/15 |
| 4,992,866 A | 2/1991 | Morgan | |
| 5,068,735 A | * 11/1991 | Tuchiya ....................... 348/213 |
| 5,182,641 A | 1/1993 | Diner et al. | |
| 5,598,209 A | * 1/1997 | Cortjens et al. ............. 348/211 |
| 5,745,161 A | * 4/1998 | Ito ............................... 348/15 |
| 5,793,367 A | * 8/1998 | Taguchi ....................... 348/15 |
| 5,821,984 A | * 10/1998 | Ito et al. ....................... 348/15 |
| 6,208,379 B1 | 3/2001 | Cya et al. | |
| 6,313,875 B1 | * 11/2001 | Suga et al. .................. 348/213 |

* cited by examiner

Primary Examiner—Wendy R. Garber
Assistant Examiner—Rashawn N. Tillery
(74) Attorney, Agent, or Firm—Fitzpatrick, Cella, Harper & Scinto

(57) ABSTRACT

In a camera control system for remote-controlling a video camera, a range within which the viewing direction of the video camera can be changed and the current viewing direction are displayed on a screen. A desired viewing direction to which the camera should be tilted or panned can be designated by a scroll bar. In response to the operation of the scroll bar, the camera is rotated to the designated direction. An image taken via the camera, which now faces in the new direction, is displayed on the screen of a controller in an enabled state in which the controller can access the camera, wherein a button of the scroll bar displayed on the screen moves with the change in the viewing direction of the camera. The amount of change in the viewing direction in a tilting or panning operation is adjusted in accordance with the zooming ratio so that when the viewing direction is changed, an image of an object on the screen is shifted by the same amount regardless of whether the camera is set to a wide-angle or narrow-angle zooming condition.

16 Claims, 18 Drawing Sheets

METHOD, APPARATUS, AND SYSTEM FOR CONTROLLING A CAMERA, AND A STORAGE MEDIUM STORING A PROGRAM USED WITH THE METHOD, APPARATUS AND/OR SYSTEM

BACKGROUND OF THE INVENTION

1. Field of the Invention

The present invention relates to a camera control system suitable for use in a video conference system, monitor camera, or similar imaging systems.

2. Description of the Related Art

It is known in the art to take an image via a camera and display the image on a screen of a display device such as a CRT wherein the camera is panned or tilted by means of remote control while watching the image on the screen. FIG. 7 illustrates an example of a display screen of such a camera control system. In FIG. 7, an image 602 of an object is taken via a camera and displayed in a view window 601. The direction of the camera can be changed (tilted) in vertical directions in response to the designation given via buttons 603 and 604. Similarly, the direction of the camera can be changed (panned) in horizontal directions in response to the designation given via buttons 605 and 606. In FIG. 7, there is also shown a cursor 607 on the screen. If the cursor 607 is put on any button 603–606 with a mouse or similar device and clicked, the pick-up direction of the camera can be changed in a desired direction.

However, in the conventional technique described above, no information is displayed on the screen about the range within which the direction of the camera can be changed, and a user cannot know the range within which he/she can change the pick-up direction of the camera. Furthermore, when it is desired to rotate the camera by a large amount so as to make a great change in the pick-up direction of the camera, it is required to click a button (603–606) a great number of times, which is a tedious operation for a user.

Furthermore, in the above technique, the pick-up direction of the camera is controlled in an incremental or decremental fashion relative to a previous direction, and it is impossible to control the viewing direction by designating the absolute camera position or absolute camera angle. For example, when the camera is remote-controlled, there is a time lag between the time of transmitting an operation command and the time of receiving an image from the camera, and thus the pick-up direction of the camera is often changed excessively beyond a desired direction. This makes it difficult to properly control the viewing direction of the camera.

SUMMARY OF THE INVENTION

In view of the above problems, it is an object of the present invention to provide a method, apparatus, and system for remote-controlling a video camera and also a storage medium for storing a program used with the method, apparatus and the system, wherein the method, apparatus, system, and storage medium have various features described below:

The range within which the viewing direction of the video camera is clearly displayed so that the video camera can be easily remote-controlled.

The viewing direction of the video camera can be indicated in units of absolute angles.

It is possible to select the range within which the viewing direction of the video camera can be changed.

It is possible to quickly control the video camera in response to given information designating the operation.

It is possible to easily change the viewing direction of the video camera.

Even at any image magnification, it is possible to properly control the amount of change in the viewing direction thereby properly changing the viewing direction of the video camera.

According to one aspect of the present invention to achieve at least one of the above features, there is provided a camera control system including a plurality of camera controllers having the capability of controlling the viewing direction of a video camera connected to the plurality of camera controllers via a network, wherein each camera controller includes:
viewing direction designating means for designating a change to be made in the viewing direction of the video camera; and
viewing direction displaying means for displaying the information about the current viewing direction of the video camera; and wherein
the camera control system further includes a server including:
control means for controlling the viewing direction of the video camera in accordance with the designation of the change in the viewing direction of the video camera given by any of the plurality of camera controllers; and
transmission means for transmitting the information about the current viewing direction of the video camera, which is controlled by the control means in accordance with the designation of the change in the viewing direction of the video camera, not only to the camera controller which has issued the designation of the change in the viewing direction of the video camera but also to the other camera controllers.

According to another aspect of the present invention, there is provided a camera controller having the capability of changing the viewing direction of a video camera connected to the camera controller via a network, the camera controller including:
viewing direction designating means for designating a change to be made in the viewing direction of the video camera; and
viewing direction displaying means for displaying the current viewing direction of the video camera in accordance with the received information about the current viewing direction of the video camera, when no designation of the change in the viewing direction of the video camera is issued.

According to still another aspect of the invention, there is provided a server for changing the viewing direction of a video camera in accordance with the designation given by a camera controller connected to the server via a network, the server including:
control means for controlling the viewing direction of the video camera in accordance with the designation of the change in the viewing direction of the video camera, the designation being received via the network; and
output means for outputting information about the current viewing direction of the video camera, which is controlled by the control means in accordance with the designation, not only to the camera controller which has issued the designation of the change in the viewing direction of the video camera but also to other camera controllers.

According to another aspect of the present invention, there is provided a method of controlling a video camera with a camera controller, the video camera being connected to the camera controller via a network, the camera controller having the capability of controlling the viewing direction of the video camera, the method comprising the steps of:

displaying an allowed range within which the viewing direction of the video camera can be changed;

designating a change to be made in the viewing direction of the video camera; and displaying the current viewing direction of the video camera in accordance with the received information about the current viewing direction of the video camera, when no designation of the change in the viewing direction of the video camera is issued.

According to a further aspect of the present invention, there is provided a method of controlling the viewing direction of a video camera with a server in accordance with an instruction given by a camera controller connected to the server via a network, the method including the steps of:

controlling the viewing direction of the video camera in accordance with designation of a change in the viewing direction of the video camera, the designation being given by the camera controller; and outputting information about the current viewing direction of the video camera, which is controlled in the step of controlling the viewing direction, not only to the camera controller which has issued the designation of the change in the viewing direction of the video camera but also to other camera controllers.

According to another aspect of the present invention, there is provided a storage medium for storing programs executed by a camera controller to control the viewing direction of a video camera connected to the camera controller via a network, the programs including:

a program for designating a change to be made in the viewing direction of the video camera; and a program for displaying the current viewing direction of the video camera in accordance with the received information about the current viewing direction of the video camera, when no designation of the change in the viewing direction of the video camera is issued.

According to still another aspect of the present invention, there is provided a storage medium for storing computer-readable programs to be executed by a server computer to change the viewing direction of a video camera in accordance with the designation given by any of a plurality of camera controllers connected to the server computer via a network, the programs including:

a program for controlling the viewing direction of the video camera in accordance with designation of a change in the viewing direction of the video camera, the designation being received via the network; and a program for outputting information about the current viewing direction of the video camera, which is controlled using the program for controlling the viewing direction, not only to the camera controller which has issued the designation of the change in the viewing direction of the video camera but also to other camera controllers.

According to another aspect of the present invention, there is provided a camera control system having the capability of controlling the viewing direction of a video camera using a camera controller, wherein the camera controller comprises:

zooming ratio designating means for designating a zooming ratio of the video camera;

viewing direction designating means for designating a change in the viewing direction of the video camera in units of predetermined amounts;

amount-of-change control means for controlling the amount of change in the viewing direction in accordance with the zooming ratio designated by the zooming ratio designating means; and the camera control system further includes a server comprising control means for controlling the viewing direction of the video camera to the direction designated by the viewing direction designating means in the units of amounts controlled by the amount-of-change control means.

According to still another aspect of the present invention, there is provided a camera controller having the capability of changing the viewing direction of a video camera, the camera controller comprising:

zooming ratio designating means for designating a zooming ratio of the video camera;

viewing direction designating means for designating a change in the viewing direction of the video camera in units of predetermined amounts; and amount-of-change control means for controlling the amount of change in the viewing direction in accordance with the zooming ratio designated by the zooming ratio designating means.

According to a further aspect of the invention, there is provided a camera control system having the capability of changing the viewing direction of a video camera with a camera controller, wherein the camera controller comprises:

zooming ratio designating means for designating a zooming ratio of the video camera;

viewing direction designating means for designating a change in the viewing direction of the video camera in units of predetermined amounts; and the camera control system further includes a server comprising:

amount-of-change control means for controlling the amount of change in the viewing direction in accordance with the zooming ratio designated by the zooming ratio designating means; and control means for controlling the viewing direction of the video camera to the direction designated by the viewing direction designating means in the units of amounts controlled by the amount-of-change control means.

According to another aspect of the invention, there is provided a server having the capability of changing the viewing direction of a video camera in response to a command given from the outside, the server comprising:

amount-of-change control means for controlling the amount of change in the viewing direction in accordance with the zooming ratio designated from an external source and control means for controlling the viewing direction of the video camera to the direction designated by the viewing direction designating means in the units of amounts controlled by the amount-of-change control means.

According to another aspect of the invention, there is provided a method of controlling a video camera with a camera controller having the capability of changing the viewing direction of a video camera, the method comprising the steps of:

designating a zooming ratio of the video camera;

designating a change in the viewing direction of the video camera in units of predetermined amounts; and controlling the amount of change in the viewing direction in accordance with the zooming ratio designated in the step of designating the zooming ratio.

According to still another aspect of the invention, there is provided a method of controlling a video camera with a server having the capability of changing the viewing direction of a video camera in response to a command given from an external source, the method comprising the steps of:

controlling the amount of change in the viewing direction in accordance with the zooming ratio designated from the external source; and controlling the viewing direction of the video camera to the direction designated in the viewing direction designating step in the units of amounts controlled in the unit amount control step.

According to a further aspect of the invention, there is provided a storage medium for storing computer-readable programs executed by a camera computer having the capability of changing the viewing direction of a video camera, the programs including:

a program for designating a zooming ratio of the video camera;

a program for changing the viewing direction of the video camera in units of predetermined amount; and a program for controlling the unit of amount of change in the viewing direction.

According to another aspect of the invention, there is provided a storage medium for storing computer-readable programs executed by a server computer having the capability of changing the viewing direction of a video camera in response to a command given from an external source, the programs including:

a program for controlling the amount of change in the viewing direction depending on the zooming ratio of the video camera designated from the external source; and a program for controlling the viewing direction of the video camera to a designated direction in the units of the controlled amount.

These and other objects and features of the present invention will be more readily apprehended from the following detailed description when read in connection with the accompanying drawings.

DESCRIPTION OF THE PREFERRED EMBODIMENTS

The present invention will be described in further detail below with reference to preferred embodiments.

Embodiment 1

Figure 1:
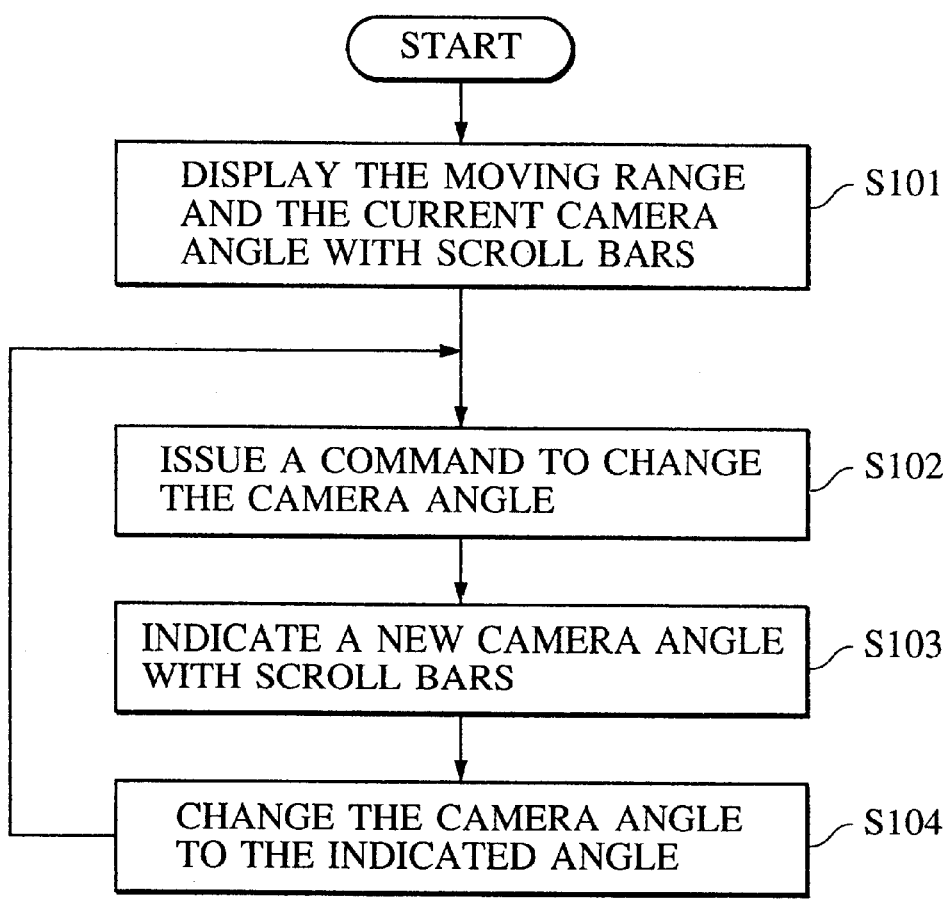
FIG. 1 is a flow chart illustrating the operation of a camera controller according to a first embodiment.

FIG. 1 is a flow chart illustrating the operation of a camera controller according to a first embodiment of the invention.

Before describing the operation of the camera controller, the construction of the camera controller of the present embodiment will be described with reference to the block diagram shown in FIG. 2.

Figure 2:
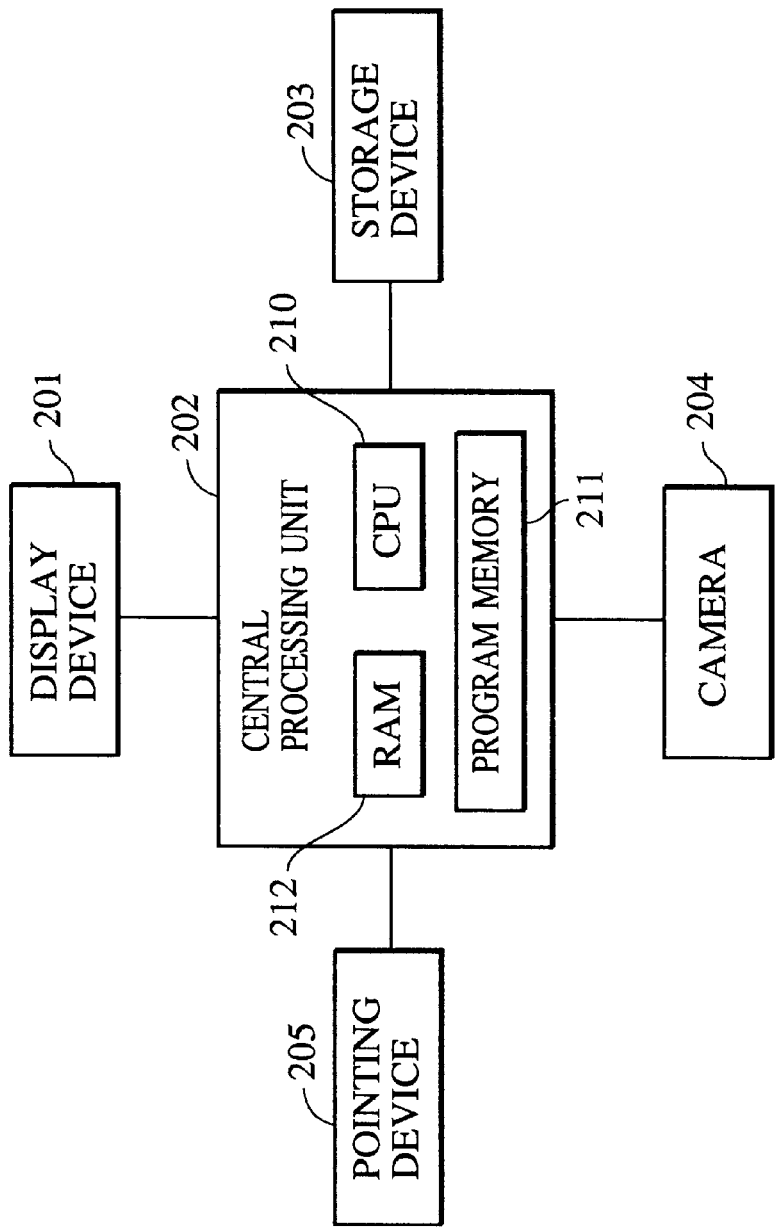
FIG. 2 is a schematic diagram illustrating the construction of the camera controller according to the first embodiment.

In FIG. 2, a display device 201 such as a CRT or a liquid crystal display device receives data from a central processing unit 202 and displays the received data. The central processing apparatus 202 includes a CPU such as a microprocessor 210, a program memory for storing a control program executed by the CPU 210, and a RAM 212 serving as a work memory area used by the CPU 210 to temporarily store various data. An external storage device 203 such as a hard disk, MO (magneto-optical) or CD (compact disc) is connected to the central processing apparatus 202. A camera 204 is connected to the central processing apparatus 202 and its operation (such as controlling the camera direction or zooming) is controlled by the central processing apparatus 202. An image is taken by the camera 204, and an image signal is transmitted from the camera 204 to the central processing apparatus 202. The display device 201 displays an image in accordance to the received image signal. A pointing device 205 (such as a mouse) is used by a human operator to move a mouse cursor on the display screen of the display device 201 and click or drag an Icon on the screen thereby controlling the angle of the camera 204.

Figure 3:
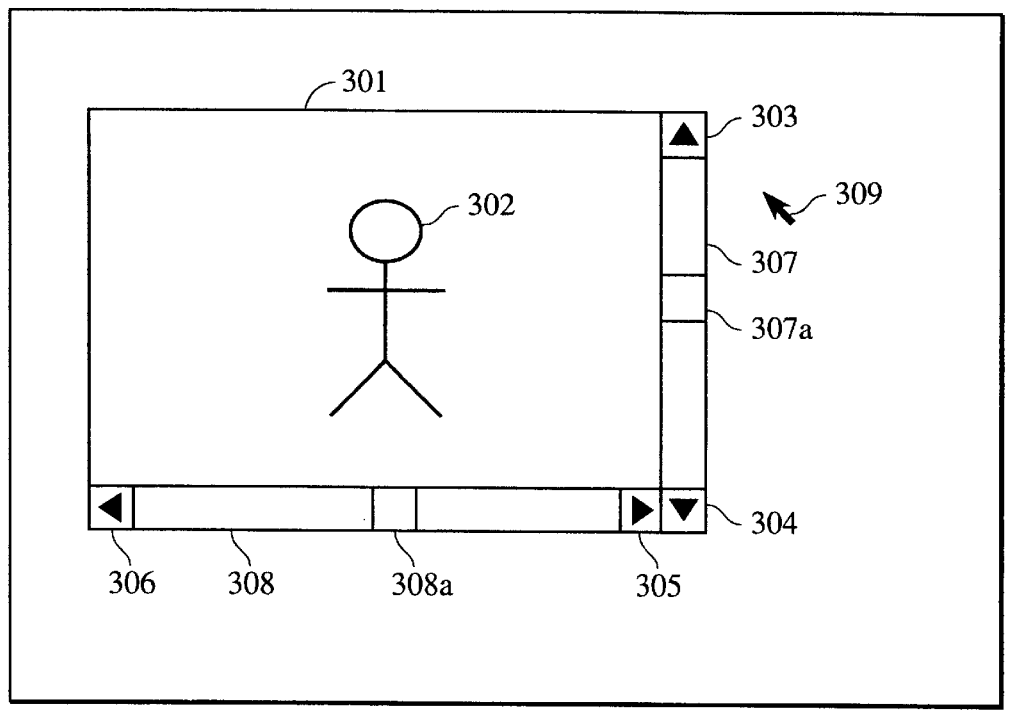
FIG. 3 illustrates an example of a screen of a display device according to the first embodiment.
Figure 4:
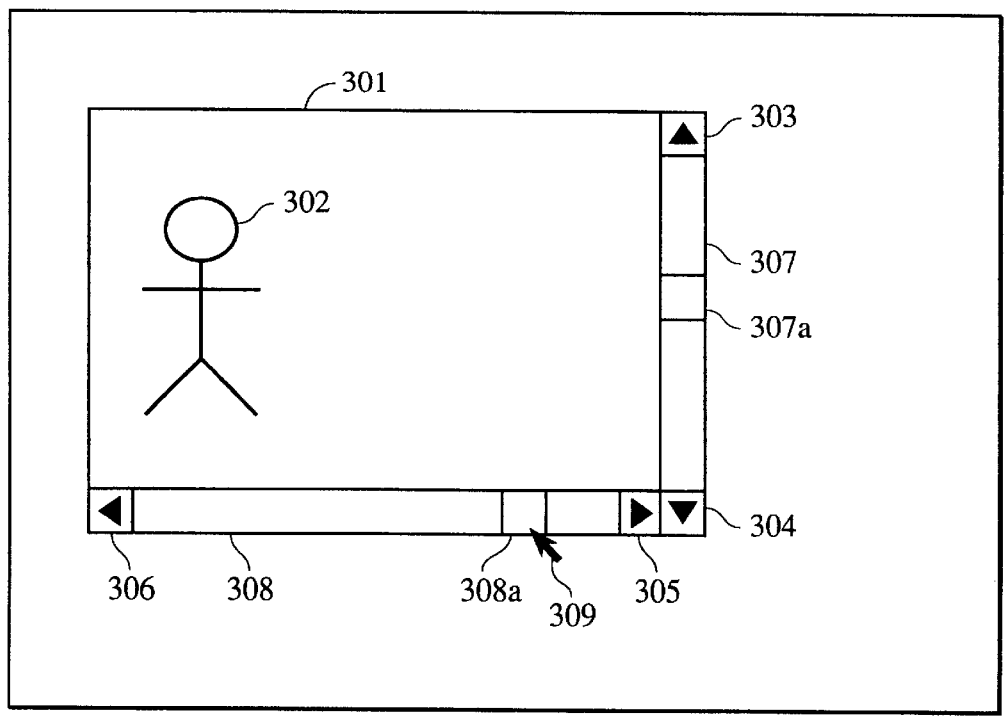
FIG. 4 illustrates another example of the screen of the display device according to the first embodiment.

FIGS. 3 and 4 illustrate examples of images displayed on the display device 201 of the camera controller of the present embodiment.

In FIGS. 3 and 4, an image 302 of an object taken via the camera 204 is displayed in a view window 301. The view window 301 is provided with scroll bars 307 and 308. The scroll bar 307 is used to control the vertical camera angle (the tilt angle) and the scroll bar 308 is used to control (pan) the horizontal camera angle. Buttons 303 and 304 are used to move the scroll bar 307 in vertical directions. Buttons 305 and 306 are used to move the scroll bar 308 in horizontal directions. In FIG. 3, there is also shown a mouse cursor 309 displayed on the screen. Each scroll bar 307 and 308 has a button 307a or 308a, which can be moved to a desired position by means of drag and drop operations with the cursor 309 thereby indicating a new angle of the camera 204 to be achieved via the pan or tilt operation. The pan and tilt operation of the camera 204 may also be designated by buttons 303, 304, 305, and 306.

Referring to the flow chart of FIG. 1, the operation of controlling the camera with the camera controller according to the present embodiment will be described below.

First in step S101, as shown in FIGS. 3 and 4, an image 301 taken via the camera 204 is displayed on the screen, wherein the tilt and pan ranges and the current viewing angle are indicated by the scroll bars 307 and 308. A human operator can issue a command via the pointing device 205 to indicate a new viewing direction of the camera 204 as will be described below. To move the viewing direction of the camera 204, for example, to the right, the operator moves the mouse cursor 309 to a point on the button 308a of the horizontal scroll bar 308, and presses the right button of the pointing device 205. The operator then moves (drags) the button 308a to the right while keeping the button of the pointing device in the pressed state. When the button 308a has come to a desired position, the button of the pointing device 205 is released (in step S102).

Thus, a new viewing direction of the camera 204 to be achieved by the pan (or tilt) operation is indicated by the new position of the button 308a (or 307a) on the scroll bar 308 (or 307) to which the button 308a (or 307a) has been dragged (step S103).

The change in the viewing angle in a horizontal or vertical direction may also be indicated by operating a button 303, 304, 305 or 306 of the scroll bar 307 or 308 as described below.

If the new viewing angle of the camera is indicated via the above operation using the pointing device 205, the process goes to step S104 in which the central processing apparatus 202 move the camera 204 to the direction indicated via the above processing steps S102 and S103. After the step S104, as shown in FIG. 4, the button 308a is shifted to the right from the previous position shown in FIG. 3, and the viewing direction of the camera 205 is moved to the right. As a result, the position of the image of the object 302 in the view window 301 is shifted to the left (herein the object itself is assumed to remain at rest). After the above steps, the process returns to step S102 so as to control the camera in accordance with commands given after that.

In this method of the invention, as is clear from the above description, it is possible to clearly indicate the range in which the viewing direction of the camera can be changed, and the camera can be remote-controlled by a simple operation.

Embodiment 2

Figure 5:
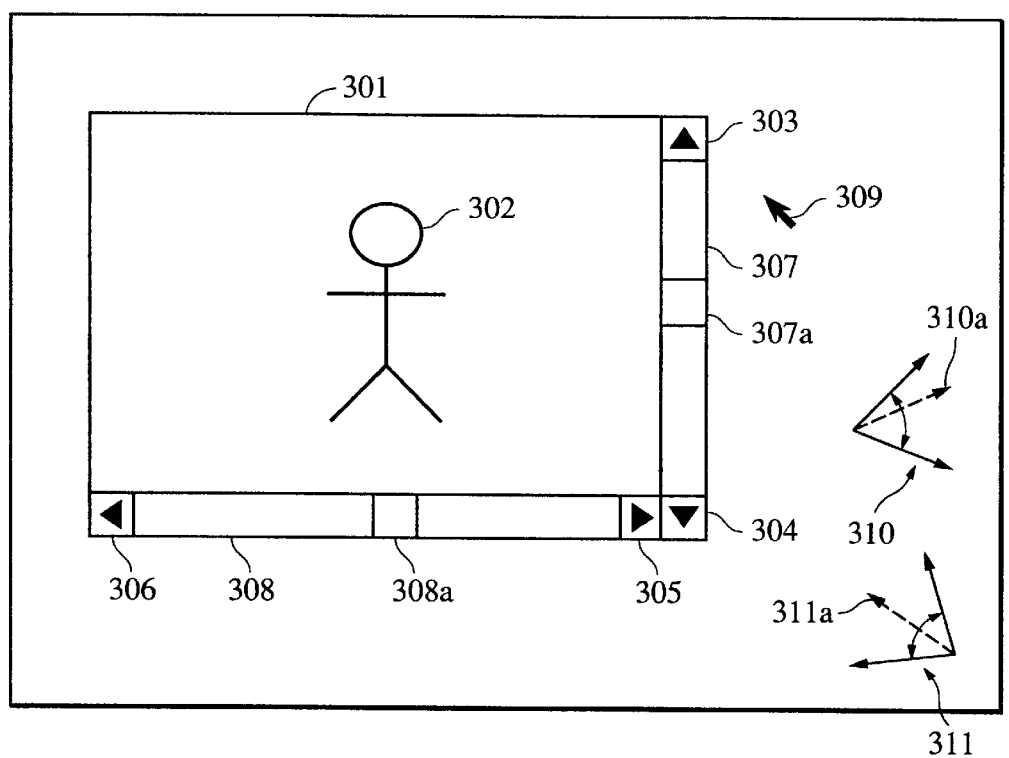
FIG. 5 illustrates an example of a screen of a display device according to a second embodiment.

In this second embodiment, as shown in FIG. 5, the range (possible range) of horizontal rotation by the scroll bar 307 is indicated by arrows 310 while the range (possible range) of vertical rotation by the scroll bar 308 is indicated by arrows 311, wherein the current vertical angle (tilt angle) of the camera 204 is indicated by an arrow 310a and the current horizontal angle (pan angle) is indicated by an angle 311a. In this case, a user can set both or at least one of the horizontal and vertical maximum ranges to desired values. In accordance with the particular ranges defined in this way, the angles of the arrow systems 310 and 311 and also the amount of change in the viewing direction of the camera corresponding to a particular amount of movement of the button 307a or 308a are determined. In an alternative mode,
the arrows 310 and 311 of FIG. 5 may be hidden in a normal state and they may be displayed on the screen in response to an operation by a user.

Figure 6:
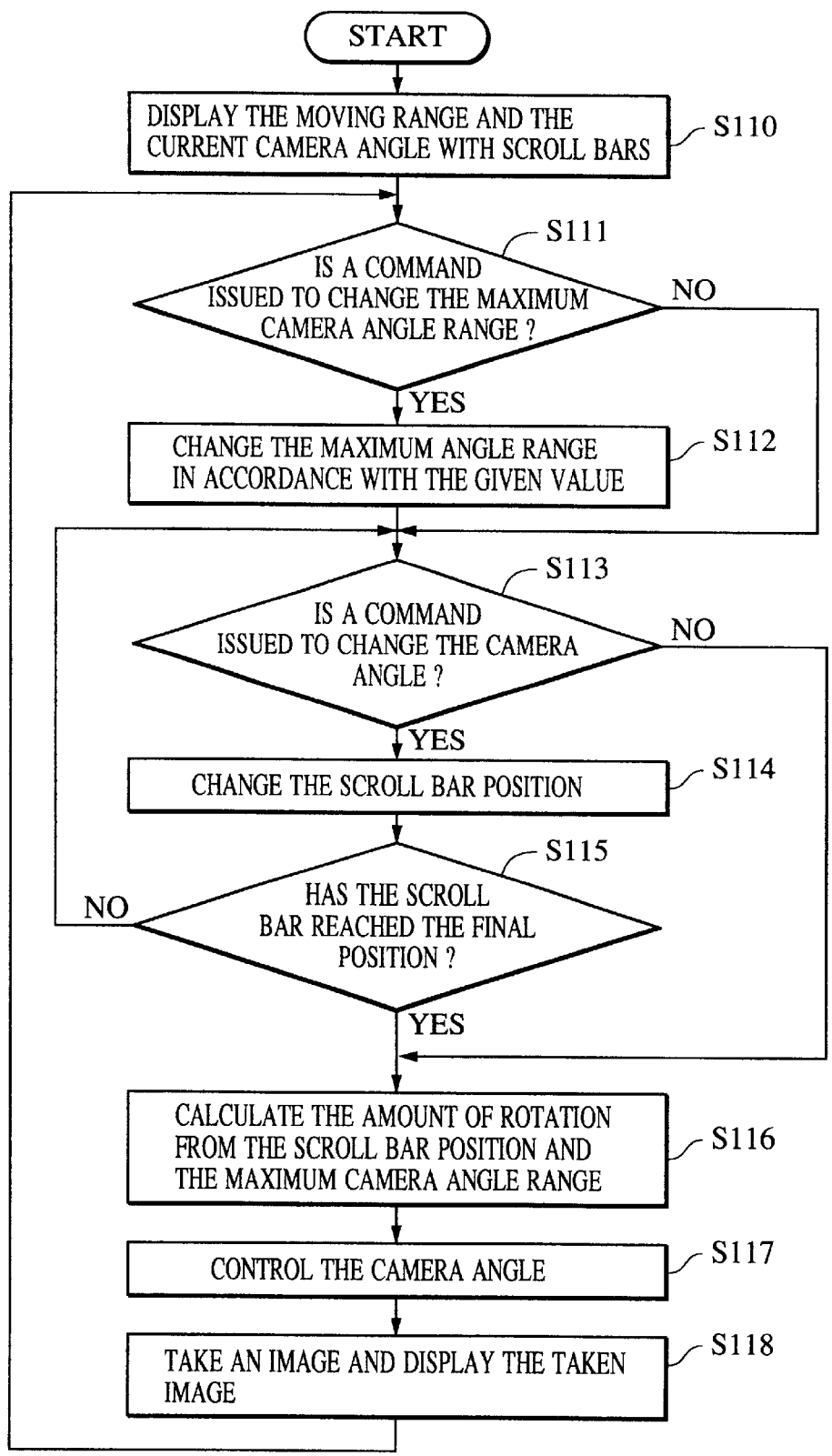
FIG. 6 is a flow chart illustrating the operation of a camera controller according to the second embodiment.
Figure 7:
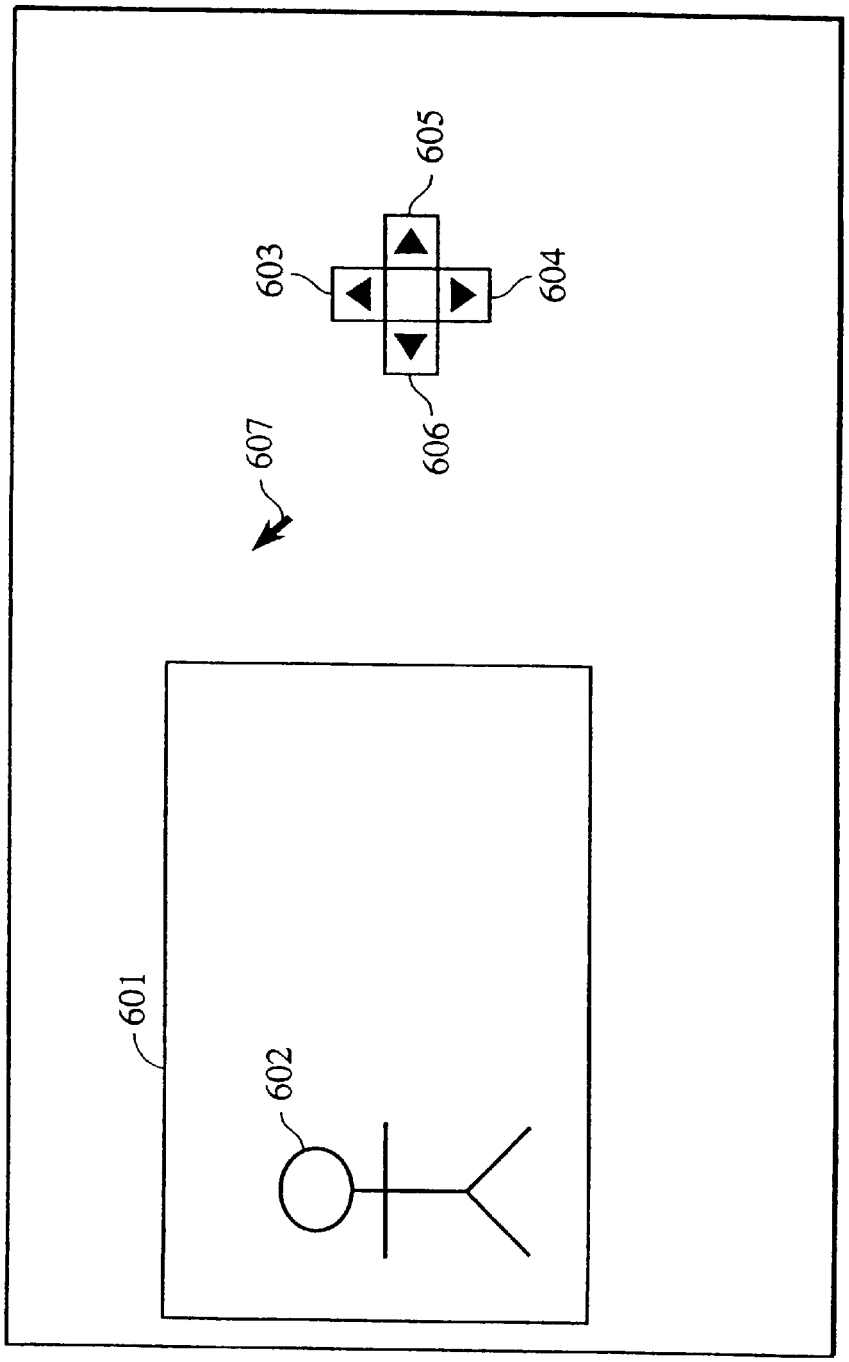
FIG. 7 illustrates an example of a screen of a display device of a camera controller.

FIG. 6 is a flow chart illustrating the operation of a camera controller according to the second embodiment, wherein it is assumed that the hardware is constructed in the same manner as in the first embodiment.

First in step S110, as in step S101 in the previous embodiment, an image 301 taken via the camera 204 is displayed on the screen, wherein the tilt and pan ranges and the current viewing direction are indicated by the scroll bars 307 and 308. If a human operator wants to have an indication by means of arrows 310 and 311, the operation can select a menu command so that the tilt and pan ranges are displayed in the form of arrows 310 and 311 as shown in FIG. 5. In the following step S111, it is checked whether the operator wants to change the horizontal and/or vertical rotation ranges. If yes, then the process goes to step S112 and a new horizontal and/or vertical range designated by the user via a keyboard or the like are stored. In this step, if the arrows 310 and 311 in the form shown in FIG. 5 are displayed on the screen, the angles of the arrows are changed in accordance with the new designated ranges.

Then the process goes to step S113, and it is checked whether a drag operation with the cursor is performed via the pointing device for indicating a new viewing direction of the camera 204. If yes, the process goes to step S114, the positions of the buttons (307a, 308a) of the scroll bars 307 and/or 308 are changed in accordance with the new designated viewing direction. Then in step S115, if it is concluded that the drag operation with the cursor 309 using the pointing device 205 has been completed, the process goes to step S116. In step S116, the amount of change in the viewing direction of the camera to be made in response to the movement of the button 307a or 308a is calculated from the position of the button 307a or 308b and the rotation range designated in step S112 (or the offset value if the rotation range is not designated). In the following step S117, the viewing direction of the camera 204 is changed in accordance with the calculated amount. In step S118, an image is taken via the camera 204 and displayed on the screen.

In this second embodiment, as described above, it is possible to designate the view direction of the camera 204 in units of absolute angles. Furthermore, it is also possible to remotely change the rotation range within which the view direction of the camera 204 can be changed. This makes it easier to perform a tilt or pan operation.

Embodiment 3

Figure 8:
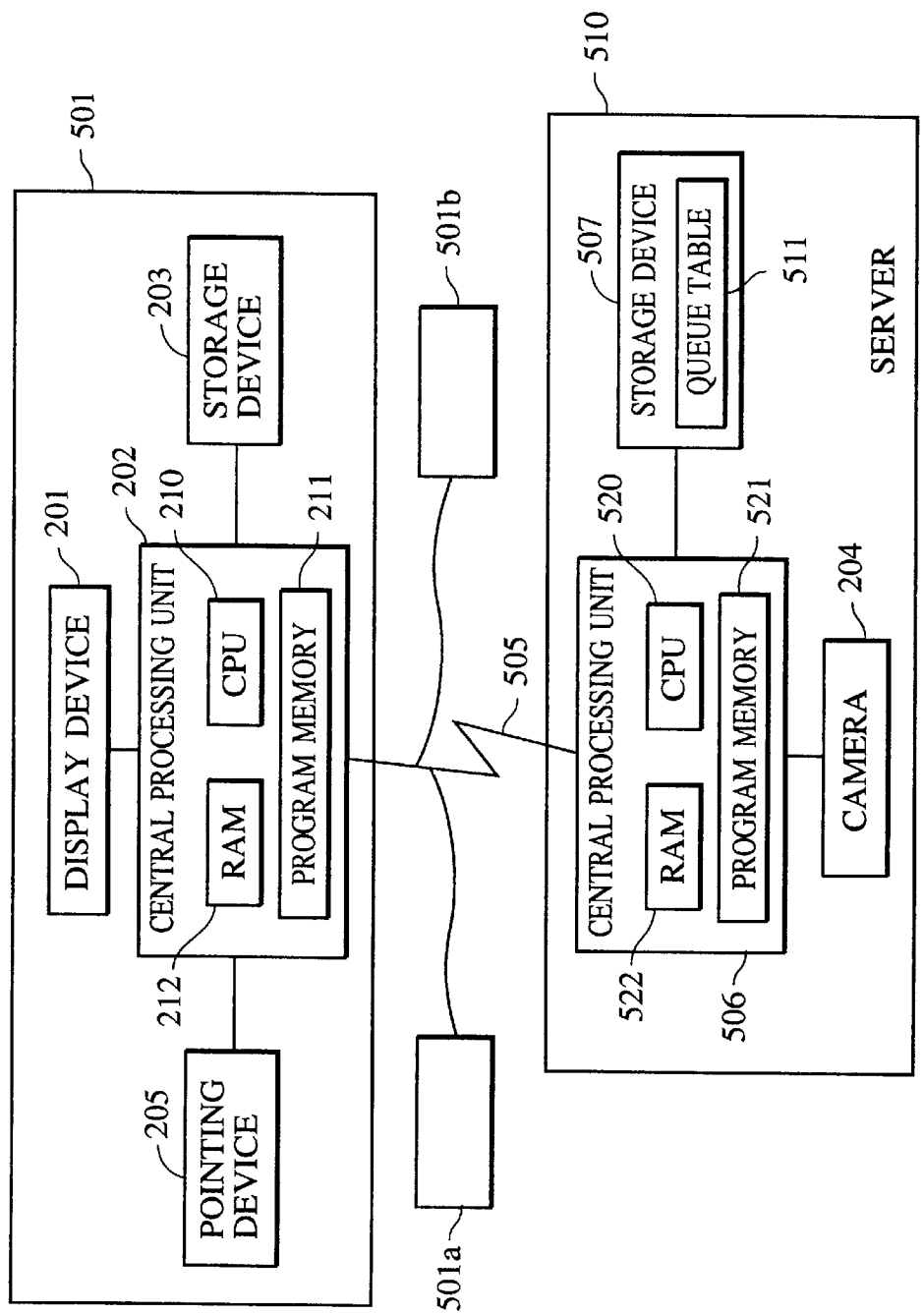
FIG. 8 is a block diagram illustrating the construction of a camera controller according to a third embodiment.

FIG. 8 is a block diagram illustrating the construction of a camera control system according to a third embodiment of the invention. In this third embodiment, a camera 204 is provided in a server 510 and the server 510 is connected to camera controllers 501 (according to the third embodiment) via a network 505 such as a public telephone line or a privately leased line. In FIG. 8, similar elements or parts to those in FIG. 2 are denoted by similar reference numerals and they are not described in further detail here. In this system, there is a rather large delay between the time of operation at the camera controller and the time of reception of an image from the server 510, and thus it is useful to designate the operation in units of absolute angles using a scroll bar.

The construction of the server 510 will be described in brief. The server 510 includes a central processing apparatus 506 for controlling the operations of the entire server 510. The central processing apparatus 506 includes a CPU such as a microprocessor 520, a memory 521 for storing a control program executed by the CPU 520, and a RAM 522 serving as a work memory area used by the CPU 520. An external storage device 507 such as a hard disk, MO or CD is connected to the central processing apparatus 506. The storage device 507 includes a queue table 511 for storing identification names of camera controllers which have issued a request that the camera controllers be enabled to control the video camera and which are waiting for acceptance of requests. The camera controllers waiting in the queue table 511 are controlled in a FIFO fashion. That is, if a certain camera controller is released from the enabled state, another camera controller which has been queued earliest of those in the queue table is enabled to control the camera. The image taken via the camera 204 is also displayed on the screen of those camera controllers waiting for acceptance of the control-enable-request. In the specific example shown in FIG. 8, the camera 204 is disposed in the server 510. However, the invention is not limited to such the construction. The camera 204 may also be located outside the server 510 and it may be connected to the server 510. In a practical system, the camera controller 501 and the server 510 may be combined into a single unit so that the camera controller 501 and the server 510 may each control the camera located in the other.

In this third embodiment, a plurality of camera controllers 501, 501a, and 501b (which are similar to each other) are connected to the system via a network 505.

Figure 9:
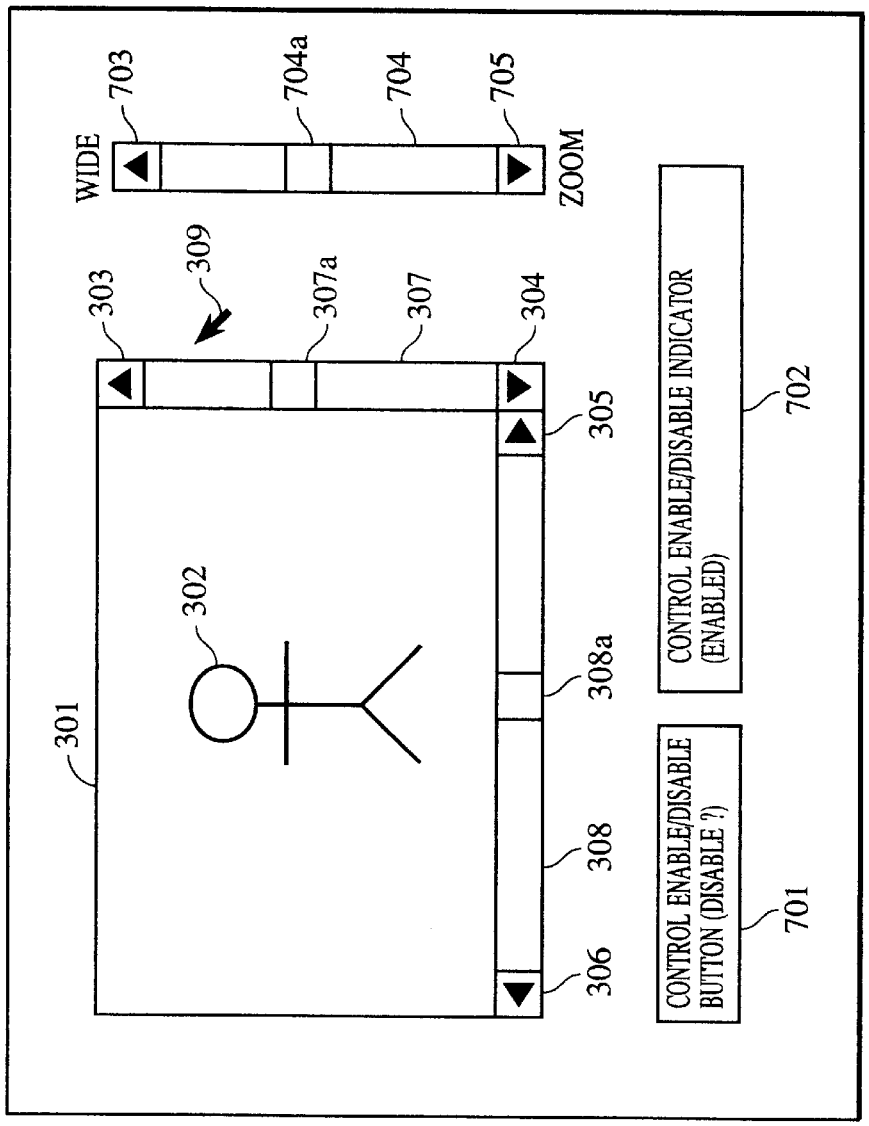
FIG. 9 illustrates an example of a screen of a display device according to the third embodiment.
Figure 10:
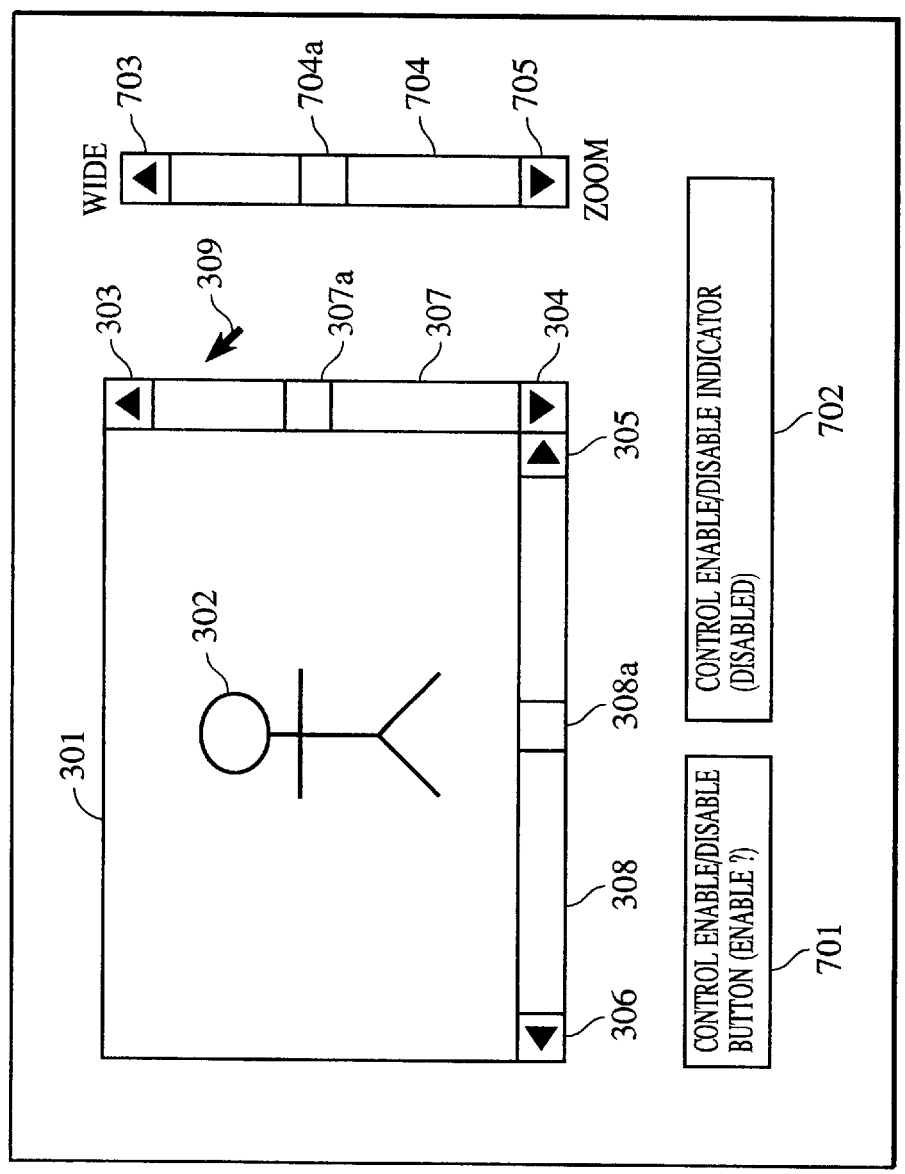
FIG. 10 illustrates another example of the screen of the display device according to the third embodiment.

FIGS. 9 and 10 illustrate examples of images which are taken via the camera 204 of the server 510 and displayed for example on the display device 201 of the camera controller 501. In these figures, similar elements or parts to those in FIGS. 3 and 4 are denoted by similar reference numerals.

In FIG. 9, a button 701 is used to issue a request that the camera controller be enabled or disabled to control the camera 204 of the server 510. A button 702 indicates whether the camera controller having that display device 201 is enabled or disabled to control the camera 204. A scroll bar 704 indicates the zooming ratio of the camera 204, wherein the zooming ratio of the camera 204 can be changed by moving the position of the button 704a. Buttons 703 and 705 are used to move the position of the button 704a. The button 704a of the scroll bar 704 may be moved in a similar manner to the button of the scroll bar 307 or 308 described earlier. The scroll bar 704 for controlling the zooming ratio of the camera 204 may also be employed in the first or second embodiment.

In the specific example of the screen of the display device 201 shown in FIG. 9, the camera controller 501 is in an enabled state in which the camera controller 501 can control the camera 204. In this state, the button 701 displays a message of "Disabled?" and the button 702 displays a message indicating that the controller 501 is in an "Enabled" state. If the button 701 is clicked using the mouse cursor 309, the controller 501 is released from the enabled state, that is, the controller 501 is disabled to control the camera 204 and another camera controller connected to the network 505 may be enabled to control the camera 204.

FIG. 10 illustrates the screen of the display device 201 for the case where the camera controller 501 is disabled to control the camera 204. In this state, the button 701 displays a message of "Enabled?" and the button 702 displays a message indicating that the camera controller 501 is in a "Disabled" state. In this state, if the button 701 is clicked using the mouse cursor 309, a request that the controller 501 be enabled to control the camera 204 is issued from the camera controller 501 to the server 510.

The operation will be described in further detail below with reference to the flow chart of FIG. 11.

Figure 11:
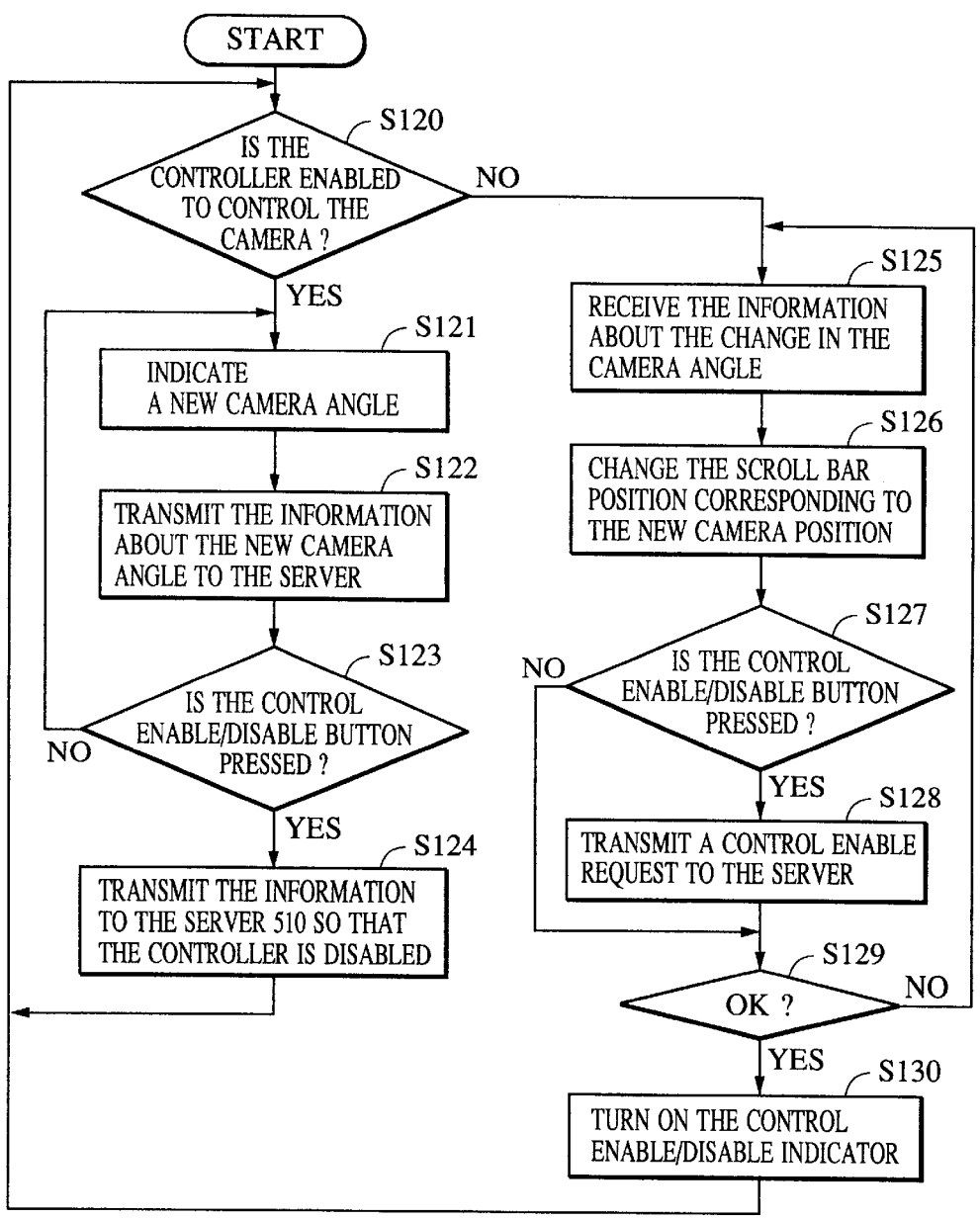
FIG. 11 is a flow chart illustrating the operation of a camera controller according to the third embodiment.

The flow chart of FIG. 11 shows the operation of the camera controller 501 shown in FIG. 8. The operation is performed in accordance with the control program stored in the program memory 211 of the central processing apparatus 202.

First, in step in S120, it is checked whether the camera controller 501 is enabled to control the camera 204 (the information representing whether the camera controller 501 is in an enabled state or disabled state is stored in the RAM 212). If the controller 501 is in an enabled state, the process goes to step S121 in which a change in the viewing direction of the camera 204 is designated by operating the scroll bar 307 or 308 with the mouse cursor 309 using the pointing device 205. After designating the change in the viewing direction, the process goes to step S122 in which the central processing apparatus 202 transmits the information about the designated change to be made in the viewing direction of the camera 204 to the server 510. In accordance with the received information, the server 510 controls the camera 204 (in terms of the tilt, pan, and zooming operation). An image is taken via the camera 204 which now faces in the designated new direction, and a corresponding image signal is transmitted from the server 510 to the controller 501. An image is displayed on the display device 201 in accordance with the received image signal (FIG. 9).

The process then goes to step S123, and the central processing apparatus 202 checks whether the button 701 is clicked to disable the controller 501. If the button 701 is not clicked, the process returns to step S121. On the other hand, if it is concluded in step S123 that a command requesting release from the enabled state is issued, the process goes to step S124 in which the server 510 is notified that the camera controller 501 should be disabled to control the camera 204. Correspondingly, the contents of the RAM 212 are updated and the message displayed on the button 701 is switched to a message indicating that the camera controller 501 is in a "disabled" state. After that, the process returns to step S120.

If it is concluded in step S120 that the controller 501 is in a disabled state, the process goes to step S125 in which the camera controller 510 receives from the server 510 information about the viewing direction controlled by another camera controller. From the received information, the central processing apparatus 202 determines the positions of the buttons of the scroll bars 307 and 308 on the screen of the display device 201. Furthermore, the central processing apparatus 202 receives image information from the server 510 via the network 505, and displays a corresponding image in the view window 301 of the display device 201 (step S126, refer to FIG. 10).

Then in the following step S127, the central processing apparatus 202 checks whether the button 701 is clicked to issue a request that the camera controller 501 be enabled to control the camera 204. If the conclusion in step S127 is negative, then the process goes to step S129. If the conclusion in step S127 is affirmative, then the process goes to step S128 and the central processing apparatus 202 issues a request to the server 510 that the camera controller 510 be enabled. Then in step S129, the central processing apparatus 202 waits for a response from the server 510. If the central processing apparatus 202 receives a signal indicating that the camera controller 501 has been enabled, the process goes to step S130 in which the contents of the RAM 212 are updated and the message displayed on the button 702 is switched to a message indicating that the camera controller 501 is in an "enabled" state. Then the process returns to step S120. On the other hand, if it is concluded in step S129 that the camera controller 501 is not enabled (and thus enters a queue), the process returns to step S125 to perform the above steps repeatedly until the central processing apparatus 202 receives in step S129 a signal from the server 510 indicating that the camera controller 501 is enabled.

Figure 12:
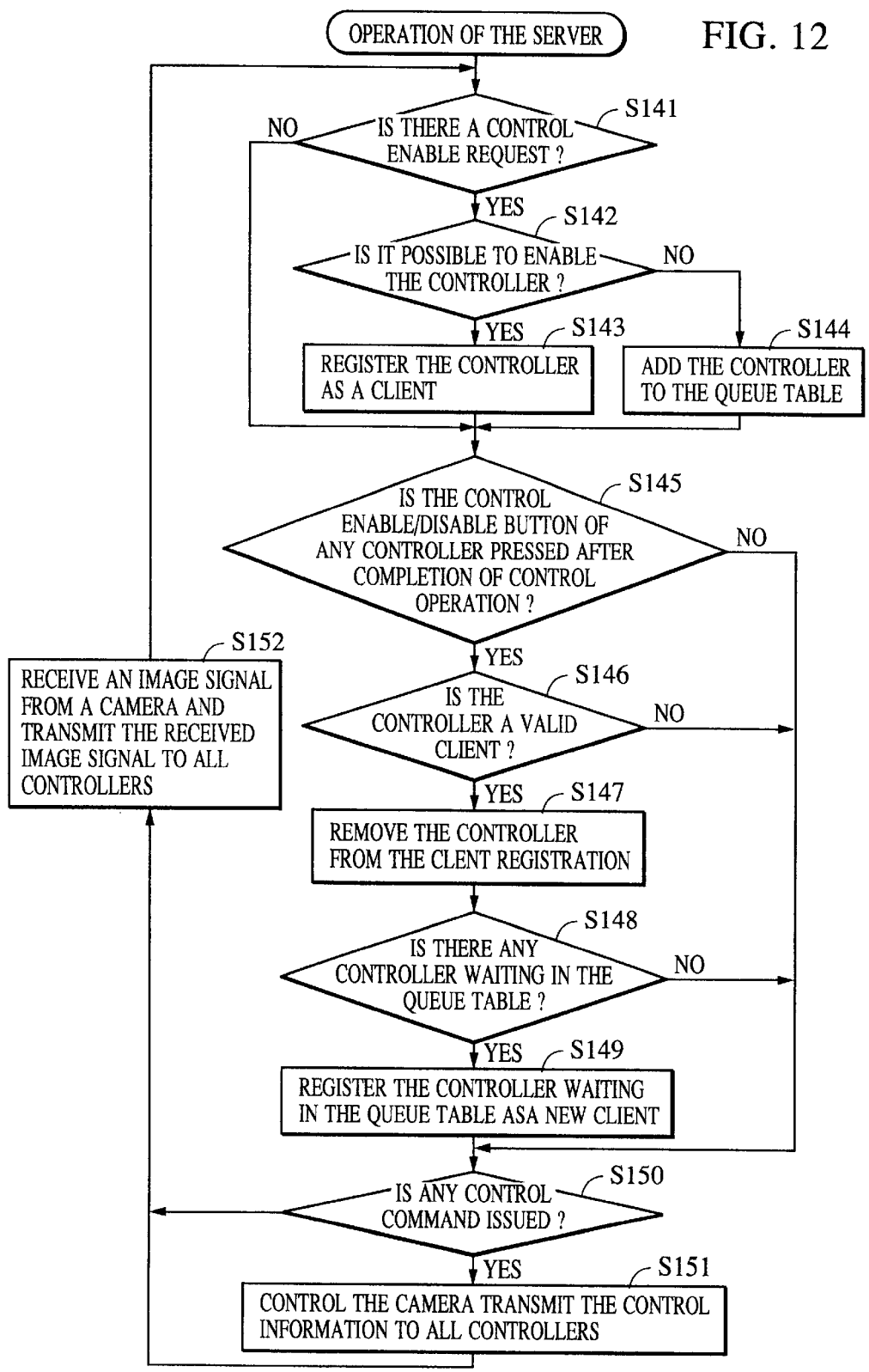
FIG. 12 is a flow chart illustrating the operation of a server according to the third embodiment.

FIG. 12 is a flow chart illustrating the operation of the server 510 according to the third embodiment of the invention, wherein the control program used in this operation is stored in the program memory 521 of the central processing apparatus 506.

First, in step S141, the central processing apparatus 506 checks whether some controller of the plurality of camera controllers connected to the network 505 has issued a request that it be enabled to control the camera 204. If it is concluded in step S141 that there is such a request, the process goes to step S142 and the central processing apparatus 506 judges whether any other camera controllers are in an enabled state or are waiting in the queue table 511, and thus whether it is possible to enable the camera controller to control the camera 204. If there are no requests from other camera controllers, the process goes to step S143 and the central processing apparatus 506 registers that controller requesting to be enabled as an enabled client. The central processing apparatus 506 then notifies the camera controller that it is enabled.

On the other hand, if it is concluded in step S142 that the camera 204 is controlled by another camera controller, or if it is concluded that some other camera controller is waiting in the queue, the process goes to step S144 and the central processing apparatus 506 registers the identification name of that camera controller requesting to be enabled in the queue table 511 in the storage device 507.

After execution of step S143 or S144, the process goes to step S145 so as to check whether a disable request is issued from the camera controller which is currently in an enabled state. If the conclusion in step S145 is affirmative, the process goes to step S146 to judge whether the request is from the camera controller which is currently in the enabled state. If yes, then the process goes to step S147 in which the identification name of that camera controller is removed from the client registration. Then in the following step S148, the central processing apparatus 506 checks whether there is a client waiting in the queue table 511. If there are plurality of clients waiting in the queue table 511, the contents of the RAM 522 are updated so that the camera controller which has been registered earliest in the queue table 511 is enabled to control the camera 204. The central processing apparatus 506 then notifies the camera controller that it is enabled to control the camera 204.

Then in the following step S150, if a control command for controlling the camera 204 is transmitted from the camera controller in the enabled state, the process goes to step S151 in which the central processing apparatus 506 controls the angle and/or other parameters of the camera 204 in accordance with the received control command. The central processing apparatus 506 then transmits the control information to all camera controllers connected via the network 505. Then the process goes to step S152 in which the central processing apparatus 506 receives an image signal from the camera 204 and transmits it to all camera controllers connected to the server 510 via the network 505. After that, the process returns to step S141.

Figure 13:
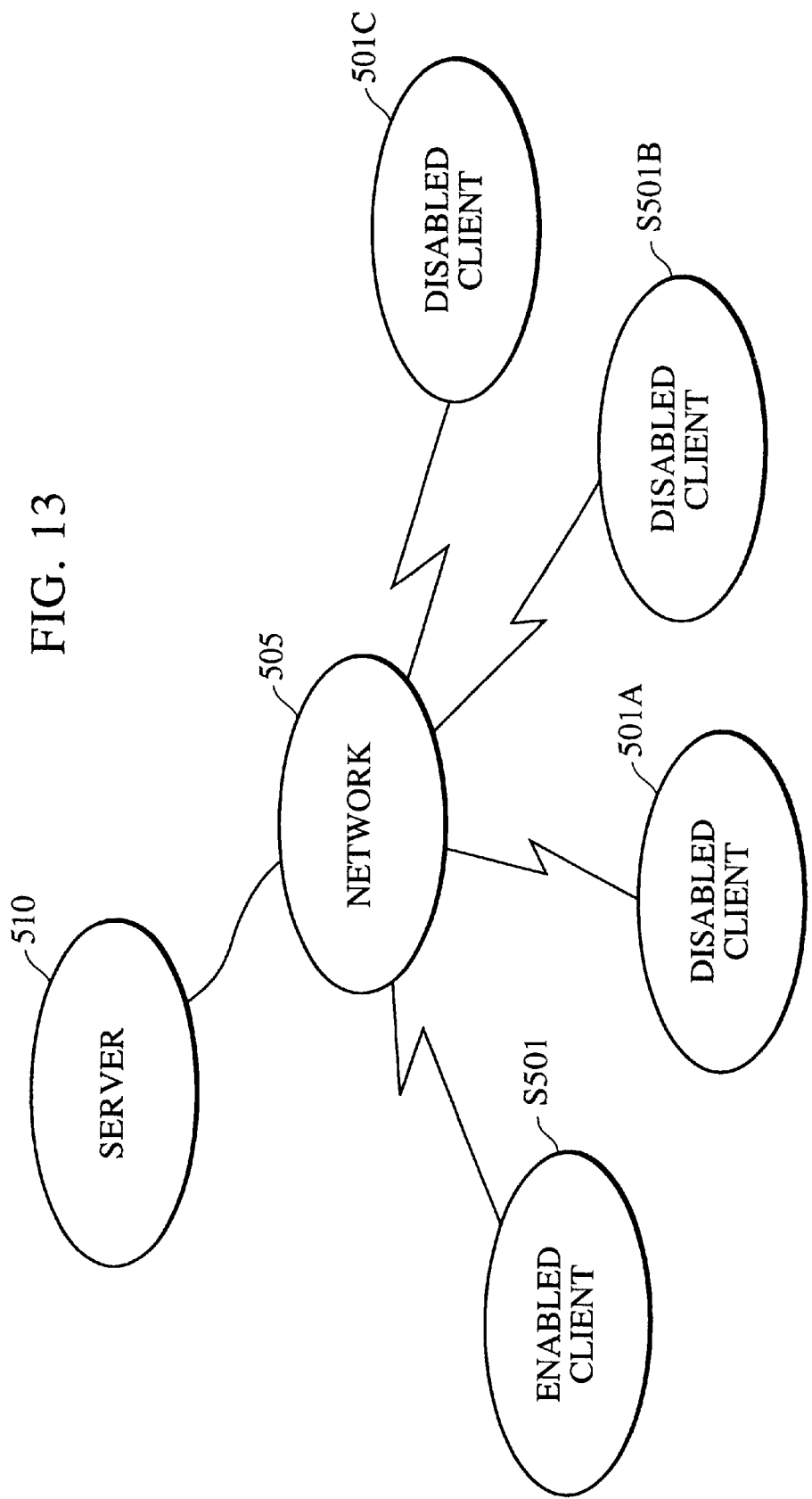
FIG. 13 is a schematic diagram illustrating the concept of a camera control system according to the third embodiment.

FIG. 13 illustrates the concept of the camera control system according to the third embodiment wherein the system includes the server 510 and a plurality of camera controllers (clients) 500–500c connected to the server 510 via the network 505. In the specific example shown in FIG. 13, a camera controller 501 is in an enabled state in which it can control the camera 204 provided in the server 510. As described above, if the camera 204 is controlled in terms of the panning and/or tilting angle and/or zooming ratio by the camera controller in the enabled state, the server 510 transmits a command to camera controllers 501a, 501b, and 501c in disabled states so that the knobs 307a, 308a, and 704a on the screen of the display device (FIG. 9) are moved in accordance with the above control operation.

Figure 14:
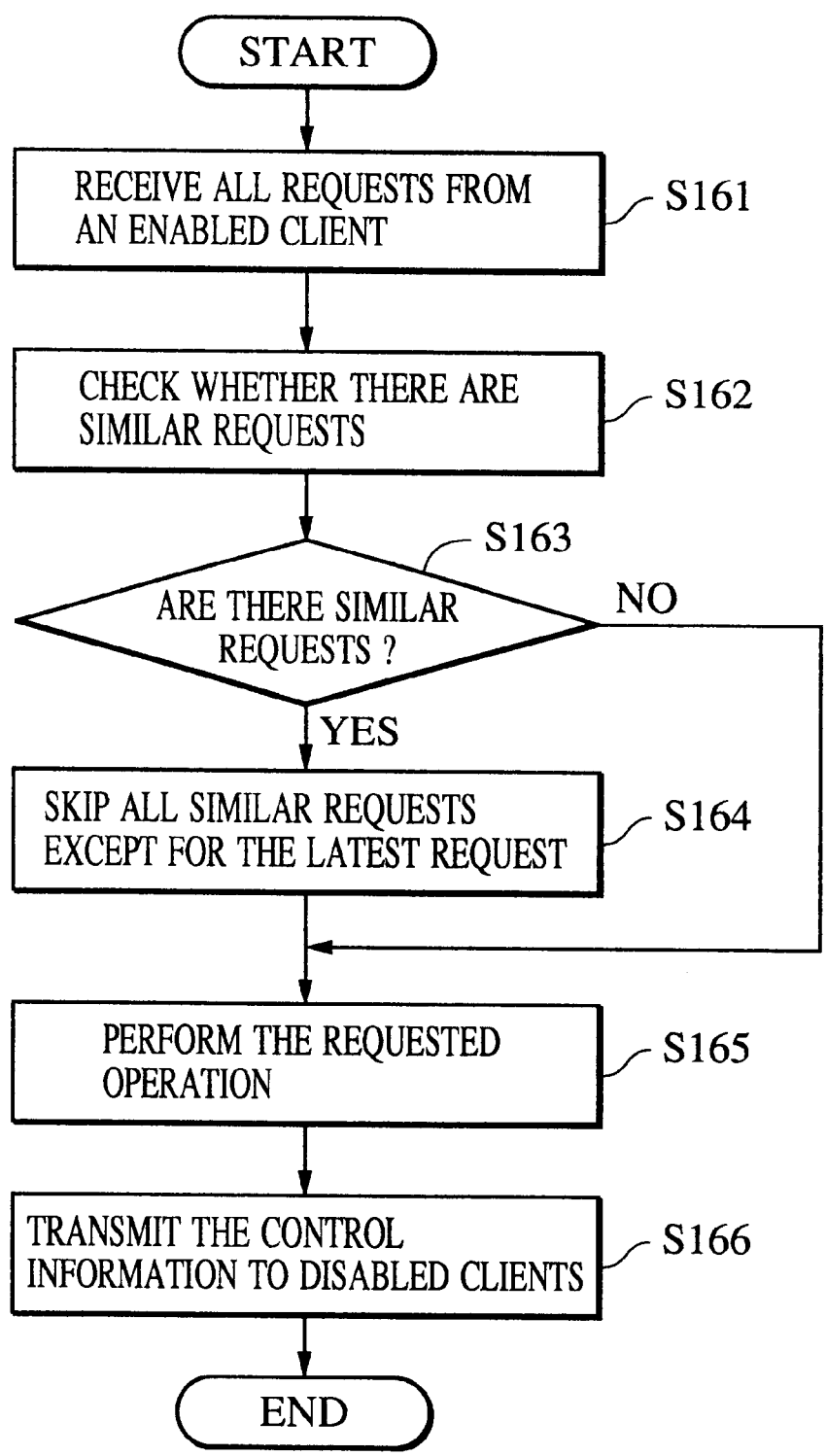
FIG. 14 is a flow chart illustrating the operation of the server according to the third embodiment.

FIG. 14 is a flow chart illustrating the operation performed by the server 510 in response to a command received from a camera controller in an enabled state in which it can control the camera 204, wherein the program executed in the above operation is stored in the program memory 521.

In step S161, the server 510 receives a request signal from a client (for example a camera controller 501) in an enabled state in which the client can control the camera 204, wherein an operation such as tilting or panning of the camera is designated for example by the scroll bar 307 or 308 and is requested by the request signal. Then in the following step S162, the central processing apparatus 506 checks whether the received request signal includes a plurality of commands of the same control item such as a pan-to-left command. If the same kinds of commands are detected, the process goes from step S163 to S164 and the commands are grouped in terms of the command items and the latest request signal is extracted from each group while the other commands are discarded. Then in step S165, the central processing apparatus 506 controls the camera in accordance with the latest command(s) extracted (corresponding to the latest knob position). For example, when the button 307a of the scroll bar 307 is continuously moved by clicking the button 303 or 304 or dragging the button 307a, the camera is controlled in accordance with the final request signal corresponding to the final position at which the knob 307a has finally stopped, while the other request signals generated on the way to the final position are neglected. This allows the central processing apparatus 506 to quickly respond to the request signal and also allows an image to be displayed quickly on a display screen. In the case where a request signal is generated by operating another scroll bar, the camera is quickly controlled in a similar manner.

In the case where it is concluded in step S163 that there are no commands of the same control items and thus the request signal includes only a single command or commands of different control items, then the process goes to step S165 and the central processing apparatus 506 controls the camera 204 in accordance with the request signal. After controlling the viewing direction of the camera 204, the process goes step S166 and the central processing apparatus 506 transmits the information about the new viewing direction to other clients (camera controllers) so that these camera controllers can update the knob positions of scroll bars in accordance with the information about the new viewing direction.

In this technique, for example, even if panning to the left and tilting in a vertical direction are alternately requested a great number of times, the camera 204 is not panned or tilted in response to each request on the way to final conditions but the camera 204 is panned and tilted to the absolute position finally designated by the buttons 307a and 308a. This allows the camera 204 to be controlled quickly and smoothly. In the case where the camera has been panned, tilted, and changed in zooming ratio, the buttons 307a, 308a and 704a on the screens of the display devices 201 of camera controllers in disabled states are moved in accordance with the above changes in the viewing angle and zooming ratio of the camera. Therefore, in this technique of the invention, not only the camera controller in the enabled state but also those camera controllers in the disabled states can acquire correct information about the viewing direction and zooming ratio of the camera 204. Herein, the camera controllers in the disabled states may be those camera controllers waiting in the queue table or those camera controllers which simply display an image taken via the camera 204.

The process shown in the flow chart of FIG. 14 is not limited to those camera controllers connected via a network, but the process may also be performed by a central processing apparatus 202 of a stand-alone type camera controller such as that described in the first or second embodiment.

Embodiment 4

Now, a fourth embodiment will be described below. The apparatus of this fourth embodiment is constructed in a similar manner to that shown in FIG. 2. Furthermore, any or all of the functions of the first through third embodiments may be incorporated into this fourth embodiment.

In addition to the features of the first embodiment, the fourth embodiment further has a feature that the amount of change in the viewing direction of the camera 204 by means of panning or tilting operation, which is made each time a button 303, 304, 305, or 306 is clicked with a cursor shown in FIG. 9 using a mouse serving as a pointing device 205, is adjusted in accordance with the current zooming ratio of the camera.

The fourth embodiment will be described in further detail below with reference with a specific example of the screen of the display device 201 shown in FIG. 9.

As described above, the scroll bar 704 is used to designate the zooming ratio, wherein the zooming ratio can be changed using a button 703 or 705. The zooming ratio of the camera 204 can also be changed by dragging the button 704a on the scroll bar 704 and moving it to a desired position.

Figure 15:
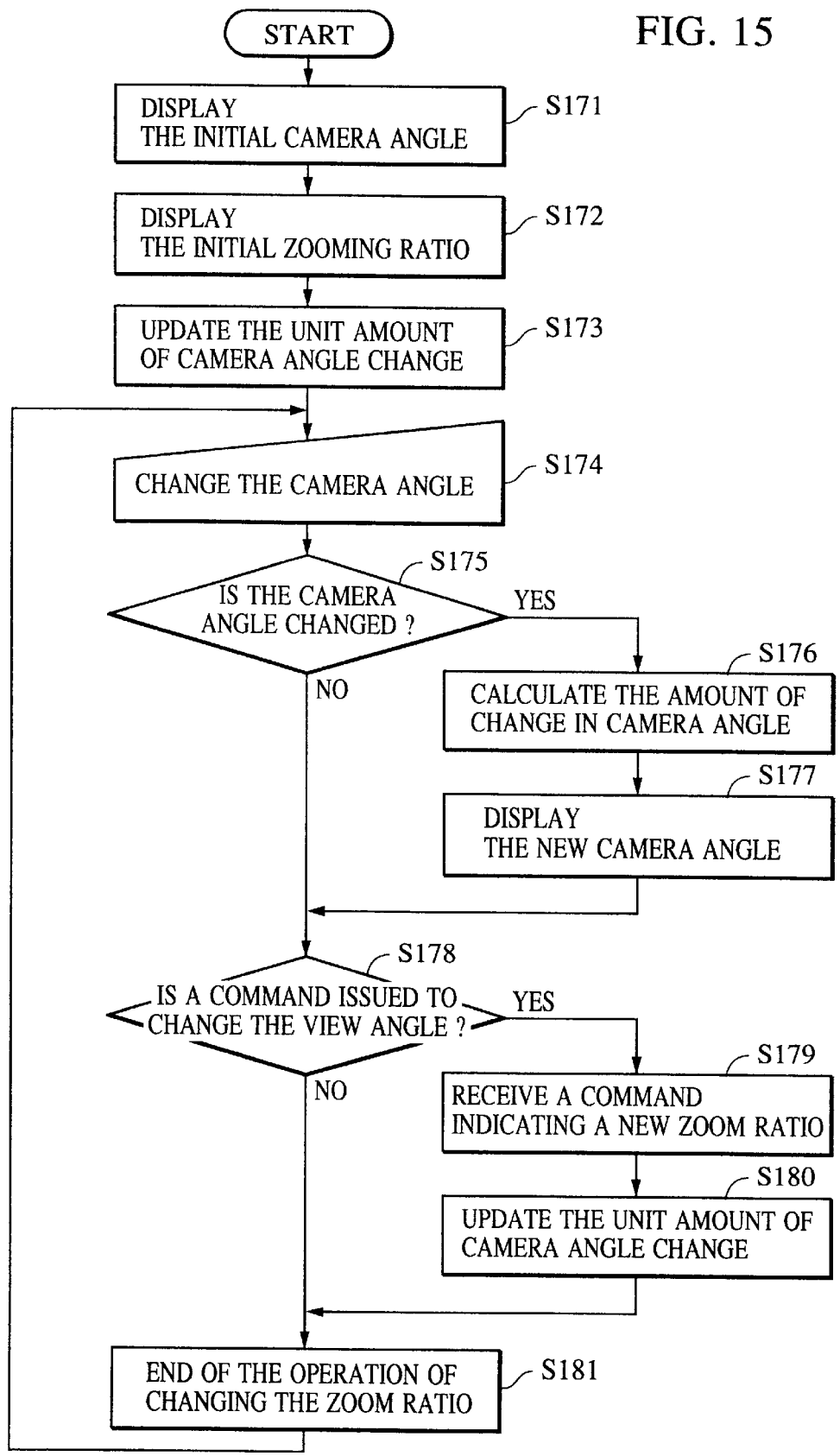
FIG. 15 is a flow chart illustrating the operation of a camera controller according to a fourth embodiment.

FIG. 15 is a flow chart illustrating the operation of a camera controller 501 according to the fourth embodiment wherein a program executed in the operation is stored in a program memory 211 of a central processing apparatus 202.

First, in step S171, the central processing apparatus 202 displays the initial conditions of the camera 202 on the display device 201. In the following step S172, the zooming range and the current zooming ratio are displayed by the scroll bar and the knob as described above. In this embodiment, the zooming ratio is determined by the horizontal viewing angle. If the horizontal viewing angle is denoted by "X", then the zooming ratio at an end of the zooming range is given by A/X (wherein A is a constant). If "A" is set to a value equal to the widest possible viewing angle, A/X represents the zooming ratio relative to the widest viewing angle. The zooming ratio is indicated for example on the scroll bar shown in FIG. 9. Then in step S173, the unit amount of change in the viewing direction of the camera per each click is determined depending on the horizontal viewing angle, and the result is stored in the RAM 212. When the horizontal viewing angle is represented by "X", the unit amount of change, which is made each time a button 305 or 306 is clicked, is given by B×X (wherein B is a constant less than unity). The unit amount of change in the vertical direction of the camera 204 (the unit amount of tilting) is determined on the basis of the vertical viewing angle calculated from the aspect ratio of the screen.

The scroll bars 307 and 308 can be operated in a similar manner to those in the previous embodiments. However, in this fourth embodiment, if a button 303, 304, 305, or 306 or a point on the scroll bar 307 or 308 is clicked or if any of these buttons is continuously pressed, then it is concluded in step S175 that the viewing angle of the camera 204 is changed and thus the process goes to step S176. When the constant "B" described above is equal to, for example, 0.1, each time the button 305 is clicked, a command is generated indicating that the camera 204 should be panned to the right by an angle equal to X/10. In response to reception of the command, the central processing apparatus of the server 510 changes the direction of the camera 204. After completion of the operation of changing the direction of the camera 204, an image is transmitted from the camera 204. Thus, in step S177, the image of the object 302 is displayed at a location shifted from the original location to the left by an amount equal to ¹⁄₁₀ of the horizontal width of the screen. In the case where the button 305 is continuously pressed, the above process is performed repeatedly at time intervals determined by a clock provided in the CPU 520. When a tilting operation is performed in response to the operation of the button 303 or 304 or the scroll bar 307, the tilting operation is performed in a similar manner to the operation described above.

Then, the process goes to step S178. In step S178, if the scroll bar 704 is operated, the process goes to step S179 in which the camera controller 501 generates a command indicating that the zooming ratio of the camera 204 should be changed as in the case of the panning or tilting operation. In response to the command, the server 510 changes the zooming ratio of the camera 204. Then in the following step S180, the viewing angle "X" corresponding to the zooming ratio is determined. As described above, when the zooming ratio is changed, the viewing angle is updated to a corresponding value, and the unit amount (B×X) of tilting or panning operation per click is also updated. The process then goes to step S181 and thus the operation of changing the zooming ratio of the camera 204 is complete.

In this embodiment, as described above, the unit amount of change in the viewing direction of the camera is adjusted depending on the zooming ratio (the unit amount of change in the viewing direction is reduced as the zooming ratio increases) so that the image of an object displayed on the screen is shifted by the same amount regardless of the zooming ratio (that is, regardless of whether the camera is set to a wide angle or a close-up condition). This feature of the invention is particularly useful to watch an image while panning or tilting the camera.

In the camera control system described above, the unit amount of change in the viewing direction per click is determined in the camera controller 501 in accordance with the zooming ratio, and the camera is moved to a designated direction in accordance with the above determined amount.

Figure 20:
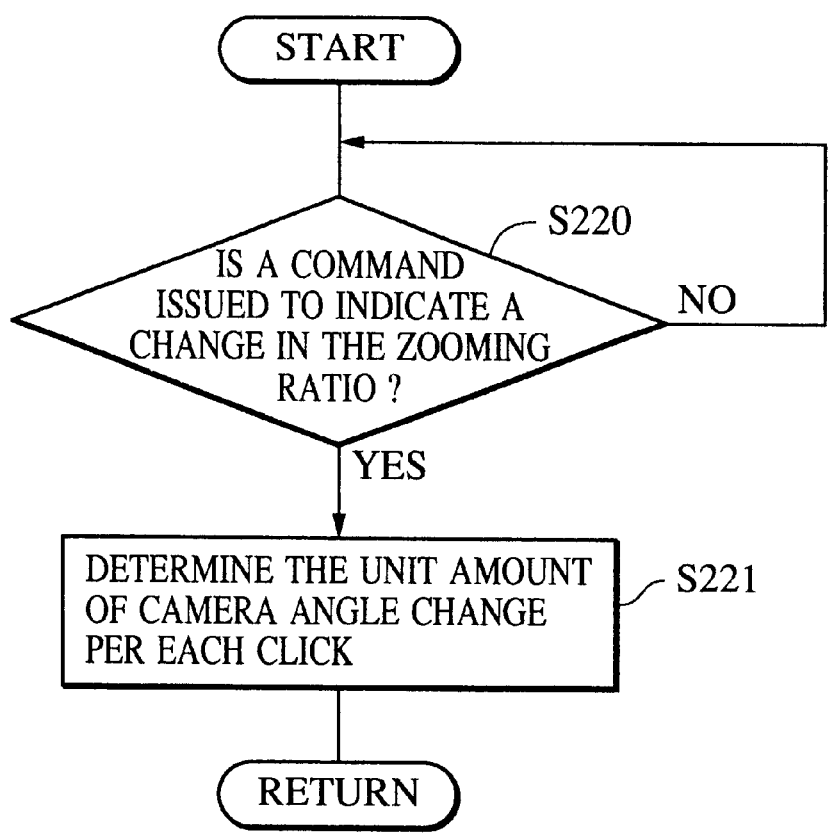
FIG. 20 is a flow chart illustrating the operation of a server according to the fourth embodiment.

However, the unit amount of change per click may also be determined in the server 510 when the server 510 receives a command requesting a change in the zooming ratio wherein the unit amount of change is determined in accordance with the new zooming ratio. In this case, what should be done by the camera controller 501 is simply to transmit a command to the server 510 to designate a change in the viewing direction of the camera or a change in the zooming ratio. FIG. 20 is a flow chart illustrating the operation performed by the server 510 when the server 510 receives a command requesting a change in the zooming ratio. In step S220, if the server 510 receives a command transmitted from a camera controller 501 to request a change in the zooming ratio, the process goes to step S221 in which the central processing apparatus 506 determines the unit amount of change in the viewing direction of the camera depending on the designated zooming ratio.

Figure 16:
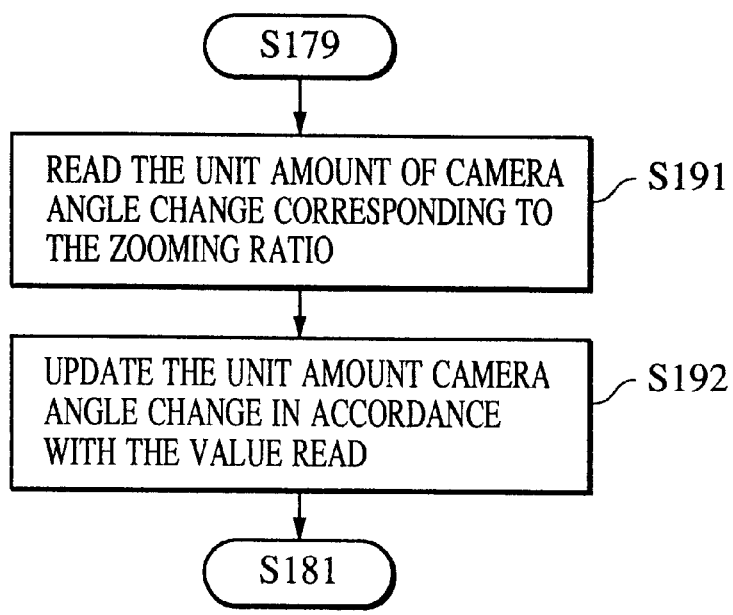
FIG. 16 is a flow chart illustrating the operation of the camera controller according to the fourth embodiment.

In an alternative mode of the invention, the unit amount of change in the viewing direction of the camera per click of each button 303, 304, 305, and 306, which depends on the zooming ratio, may be stored in the storage device 203 or 507. FIG. 16 is a flow chart illustrating the operation of the camera controller. If a zooming ratio is designated in step S179 shown in FIG. 15, the process goes to step S191 and data representing the unit amount of change corresponding to the designated zooming ratio, which should be made when any of buttons 303, 304, 305 and 306 is clicked once, is read from the storage device 203. Then in step S192, the unit amount of change per click of each button 303, 304, 305, and 306 is updated in accordance with the data. The process goes to step S181 (in FIG. 15). Thus, if a desired change in the viewing direction of the camera is designated in step S175, the process goes to step S176 and the central processing apparatus 506 calculates the amount of change in the viewing direction of the camera 204 on the basis of the information about the unit of amount of change updated in step S192. In this method of the invention, when the viewing direction of the camera 204 is changed, the corresponding shift of an image of an object on the screen is the same regardless of the zooming ratio designated by a client.

Figure 17:
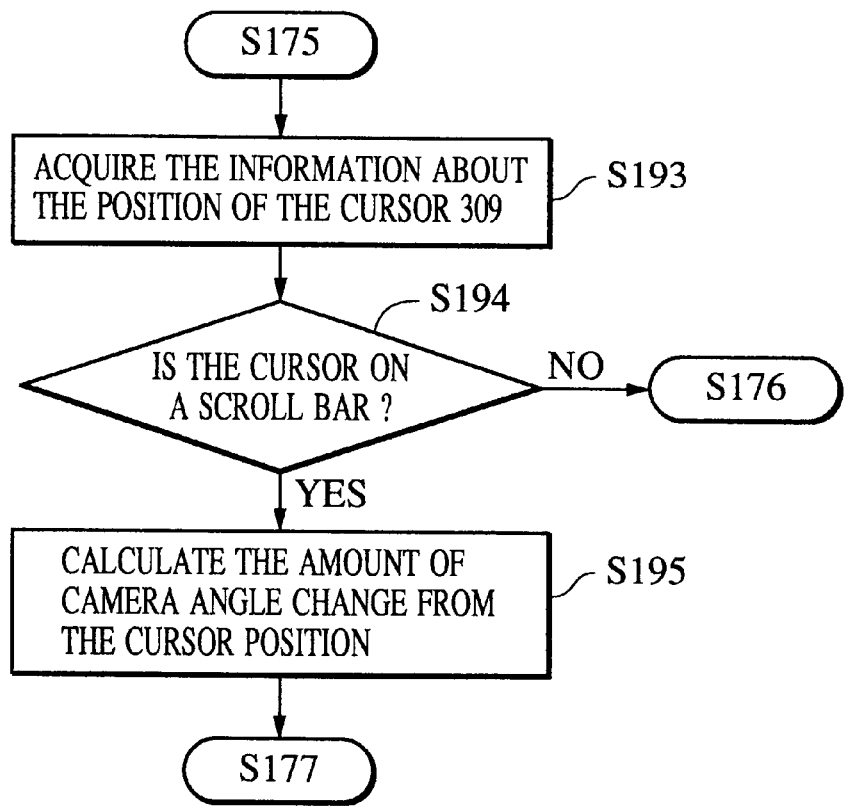
FIG. 17 is a flow chart illustrating the operation of the camera controller according to the fourth embodiment.

FIG. 17 is a flow chart illustrating the operation of the camera controller in which the amount of change in the viewing direction of the camera 204 according to the zooming ratio may be modified depending on the position of the cursor 309.

In step S175 in FIG. 15, if a change in the viewing direction of the camera 204 is designated, the process goes to step S193 in FIG. 17 to acquire information about the position where the cursor 309 is located when the pointing device 205 is clicked. Then the process goes to step S194 to judge whether the cursor 309 is located on the scroll bar 308 or 307. If the conclusion in step S194 is negative, then it is assumed that the cursor is on a button and the process goes to step S176 so as to perform the above-described operation. On the other hand, if it is concluded in step S195 that the cursor is on the scroll bar 308 or 307, then the process goes to step S195 and calculates the amount of change in the viewing direction in accordance with the position of the cursor 309 on the scroll bar. Then the process goes to step S177 (FIG. 15).

In this method, the amount of change in the viewing direction achieved by a panning or tilting direction in accordance with the zooming ratio is determined depending on the position of the cursor 309 on the scroll bar, and thus the viewing direction can be changed to a desired direction without having to operate the button 304 or 307 a great number of times.

In the case where any of buttons 303, 304, 305, and 306 is clicked when the knob 307a or 308a is located near either end of the scroll bar 307 or 308, if the amount of change in the viewing direction corresponding to the movement of the knob from the current position to the end of the scroll bar is smaller than the unit of amount of change in the viewing direction per click, then the viewing direction of the camera is moved to a direction corresponding to the end of the scroll bar.

Figure 18:
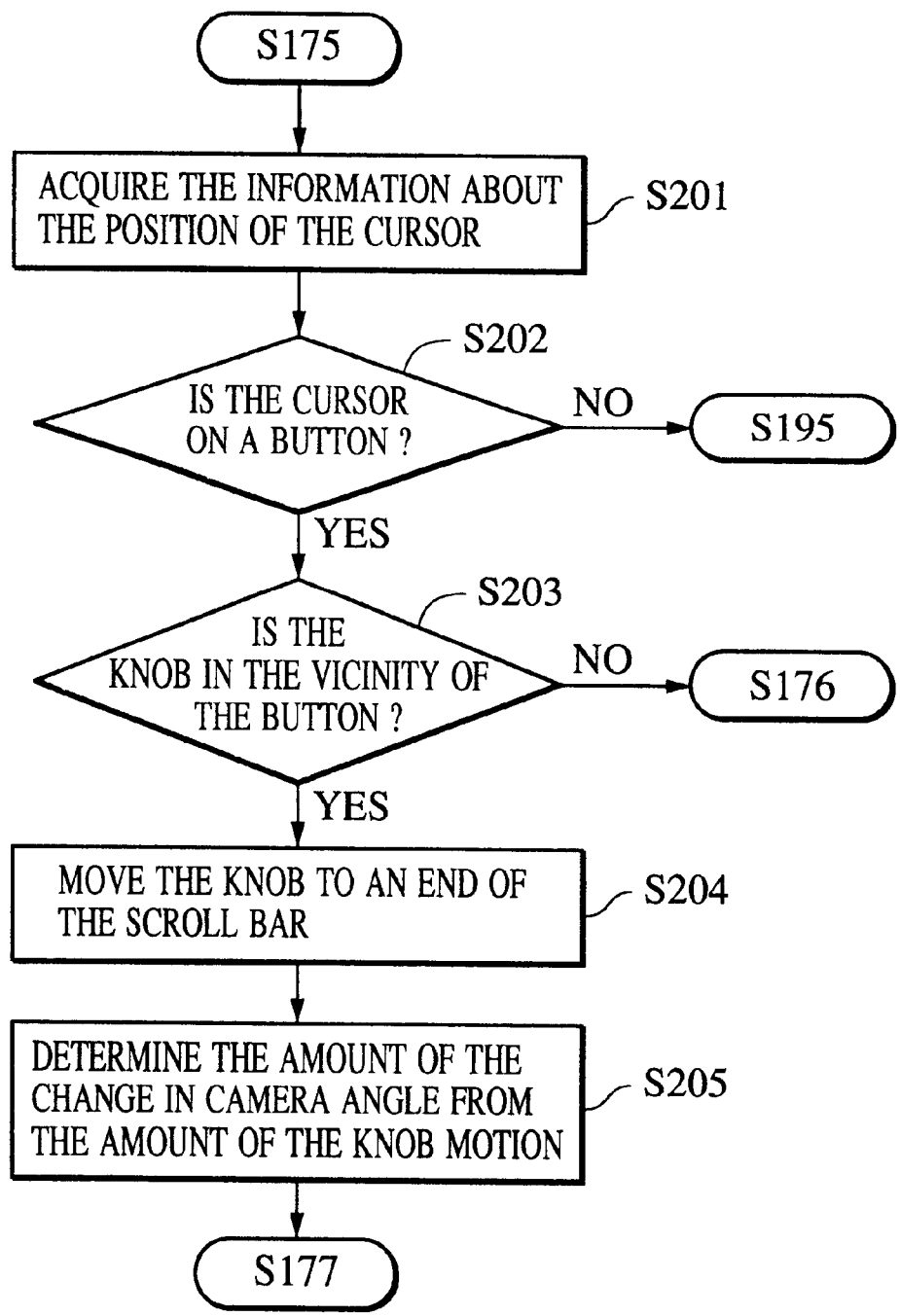
FIG. 18 is a flow chart illustrating the operation of the camera controller according to the fourth embodiment.

FIG. 18 is a flow chart illustrating such an operation of the camera controller.

In step S201 in FIG. 18, a change in the viewing direction of the camera 204 is designated. Then in step S202, the central processing apparatus 202 checks whether the cursor 309 is located on a button. If yes, then the process goes to step S203. In step S203, the central processing apparatus 202 checks whether the distance between the knob and that button is less than a value corresponding to the unit amount of change per click. If the conclusion in step S203 is negative, then the process goes to step S176 (FIG. 15) and the knob is moved by an amount corresponding to the unit amount of change per click, and the amount of change in the viewing direction is calculated. On the other hand, if it is concluded in step S203 that the distance between the knob and the button is less than the value corresponding to the unit amount of change per click, then the process goes to step S204 and the knob is moved to the end of the scroll bar. Then in step S205, the amount of change in the viewing direction of the camera 204 corresponding to the movement of the knob is calculated.

Alternatively, when a button is moved by means of dragging, the unit amount of change, per click, of any button 303, 304, 305, 306, in terms of the viewing direction of the camera 204 in accordance with the zooming ratio, may be determined based on the difference between the start point and end point of the dragging operation.

Figure 19:
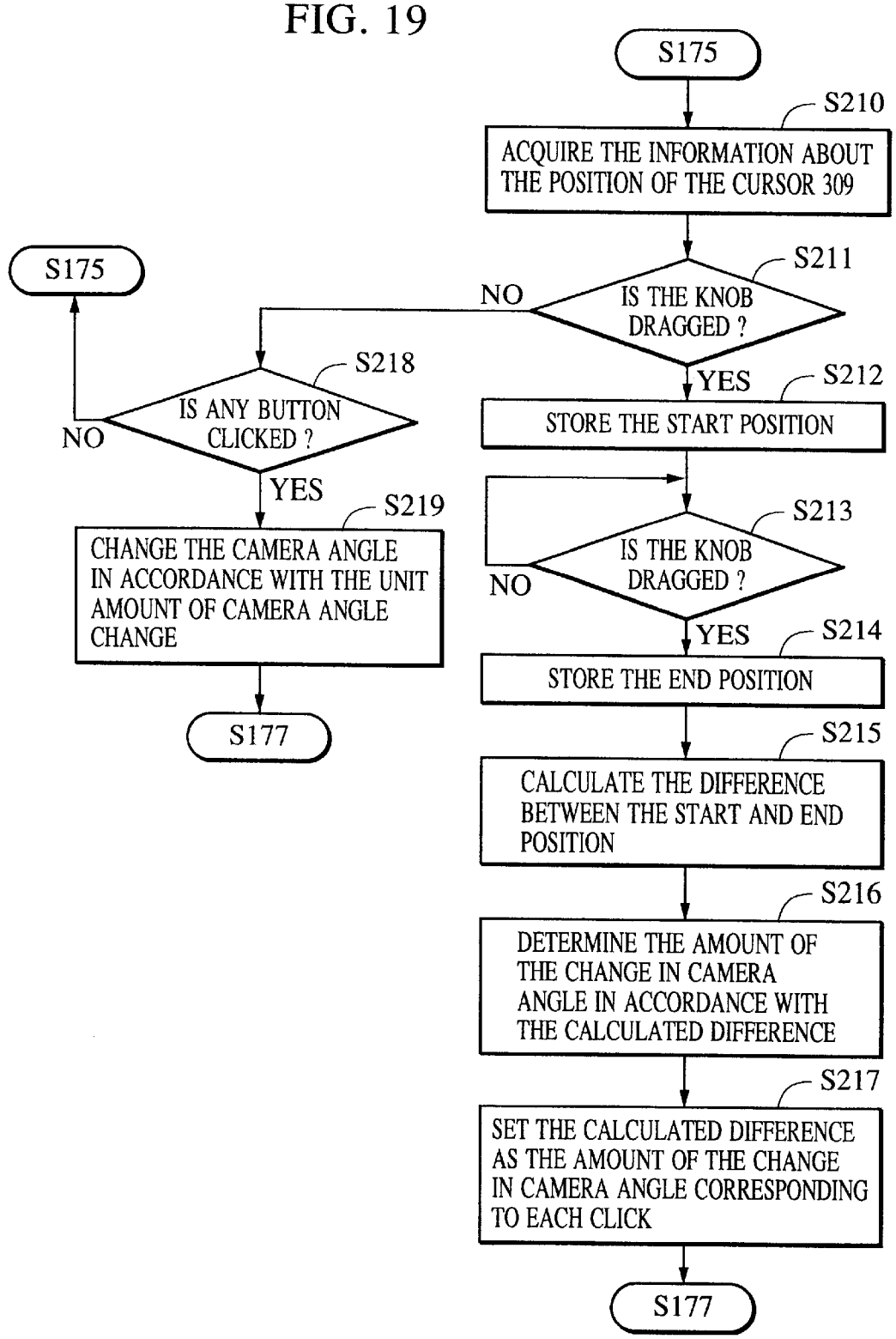
FIG. 19 is a flow chart illustrating the operation of the camera controller according to the fourth embodiment.

FIG. 19 is a flow chart illustrating such an operation of the camera controller. First, in step S210 in FIG. 19, the central processing apparatus 202 acquires information about the location of the cursor 309. Then in the following step S211, the central processing apparatus 202 checks whether a button is dragged. If yes, then the process goes to step S212 and the start position of the dragging operation is stored. Then in step S213, the central processing apparatus 202 judges whether the dragging operation is completed. If it is concluded in step S213 that the dragging operation is completed, the process goes to step S214 and the end point of the dragging operation is stored. Then in step S215, the difference between the start point and end point is determined. Furthermore, in step S216, the amount of change, to be made, in the viewing direction of the camera 204 is determined from the above difference. Then in step S217, the above difference is employed as the unit amount of change in the viewing direction of the camera, per click of the pointing device 205. After that, the process goes to step S177.

On the other hand, if it is concluded in step S211 that the buttons 307a and 308a are not dragged, the process goes to step S218 to check whether any of buttons 303, 304, 305, and 306 is clicked. If some button is clicked, the process goes to step S219. In step S219, the amount of change to be made, in the viewing direction of the camera 204, is calculated from the unit amount of change defined in step S217. Then in step S177, a control command is generated to change the viewing direction of the camera 204.

In this technique of the invention, the unit amount of change in the viewing direction per click can be set by a user to a desired value. This makes it possible to quickly control the viewing direction of the camera without having to operate a button or scroll bar a great number of times.

Thus, the fourth embodiment has the following advantages.

The user can easily know the range within which the viewing direction of the camera can be changed. This allows the user to easily control the camera.

The direction of the camera can be changed simply by moving the button of a scroll bar. This also makes it easy to control the camera.

The direction of the camera can be designated by an absolute angle. This makes it easy to control the camera to a desired direction even in the case where the camera is remote-controlled and thus there is a delay between the time when the viewing angle of the camera is changed and the time when the change in the viewing direction is reflected in an image signal taken via the camera.

The maximum range in which the direction of the camera is changed can be set to a desired value. This makes it possible to easily remote-control the camera so that the direction of the camera is controlled within a particular range.

When the viewing direction of the camera is controlled via a network, it is possible to select one particular client and enable the selected client to control the camera.

When the camera is remote-controlled, similar request signals are grouped and only one request signal which is the latest of the group is executed. This makes it possible to control the camera more quickly and easily than in the case where every request signal is executed.

The invention has been described above with reference to first through fourth embodiments. In the first, second, and fourth embodiments, the invention is applied to a stand-alone type apparatus, while a plurality of such apparatus are combined via a network in the fourth embodiment.

The individual components shown in outline are designated by blocks in the Drawings are all well-known on the computer art, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arraingements included within the spirit and scope of the appended claims. The scope of the following claims is to be accorded the broadest interpretation so as to encompass all such modifications and equivalent structures and functions.

What is claimed is:

1. A camera control system comprising:
    a plurality of camera controllers each having the capability of controlling a pick-up direction of a video camera connected to said plurality of camera controllers via a network, each said camera controller including:
        an input device adapted to receive input information about a change to be made in the pick-up direction of said video camera; and
        a display device adapted to graphically display the same input information about a current pick-up direction of said video camera; and
    a server including:
        a control device adapted to control the pick-up direction of said video camera in accordance with the designation of the change in the pick-up direction of said video camera given by any of said plurality of camera controllers,
    wherein, in the case where the input information includes a plurality of commands for the same movement operation, said control device controls the direction of said camera in accordance with the command which is the latest.

2. A camera control system according to claim 1, wherein said display device displays information about an allowed range within which the pick-up direction of said video camera can be at least one of tilted and panned.

3. A camera control system according to claim 1, wherein said display device displays information about an allowed range within which the pick-up direction of said video camera can be changed, and
    wherein said control device sets the limits of said allowed range of the pick-up direction.

4. A camera control system according to claim 1, wherein said display device displays information about an allowed range within which the pick-up direction of said video camera can be changed, said information being represented by a scroll bar.

5. A camera control system according to claim 4, wherein said display device displays an index on said scroll bar to represent the current pick-up direction of said video camera.

6. A camera control system according to claim 5, wherein said input device inputs a change in the pick-up direction of said video camera by moving said index.

7. A computer-readable storage medium for storing programs executed by a server computer to change a pick-up direction of a video camera in accordance with designations given by any of a plurality of camera controllers connected to the server computer via a network, said programs including:
    a program for controlling the pick-up direction of the video camera in accordance with a designation of a change in the state of the video camera, the designation being received via the network; and
    a program for, in the case where the designations include a plurality of commands for the same movement operation, controlling the direction of the video camera in accordance with the command which is the latest.

8. A storage medium according to claim 7, further storing a program for causing the server computer to transmit information about a current pick-up direction of the video camera to the camera controller to which an image taken via the video camera is supplied.

9. A server for controlling a video camera in accordance with designations given by a plurality of clients, each of which displays information about a state of the video camera, via a network, said server comprising:
    an input unit adapted to input the designations; and
    a control unit adapted to control the video camera in accordance with the designation given by one of the plurality of clients, the designation being received via the network,
    wherein, in the case where the designations include a plurality of commands for the same operation, said control unit controls the video camera in accordance with the command which is the latest.

10. A server according to claim 9, wherein the other clients are provided with an image taken by the video camera.

11. A server according to claim 9, further comprising an output unit for outputting, from said server, non-image data comprising the same information about a current state of the video camera, which is controlled by said control unit in accordance with the designation, not only to the client which has issued the designation of the change of the video camera but also to other clients coupled to the server, wherein said output unit outputs the non-image data including information about a current pickup direction of the video camera in accordance with the command which is the latest.

12. A server according to claim 9, further comprising an output unit for outputting, from said server, non-image data comprising the same information about a current state of the video camera, which is controlled by said control unit in accordance with the designation, not only to the client which has issued the designation of the change of the video camera but also to other clients coupled to the server, wherein said output unit outputs the non-image data including information about a current zoom state of the video camera in accordance with the command which is the latest.

13. A method of controlling a video camera in accordance with an instruction given by a client via a network, said method comprising the steps of:
    inputting a designation given by a camera controller; and
    controlling the video camera in accordance with the designation given by the camera controller, wherein, in the case where the designation information includes a plurality of commands for the same operation, the camera controller controls the camera in accordance with the command which is the latest.

14. A method according to claim 13, wherein the other clients are provided with an image taken by the video camera.

15. A method according to claim 13, further comprising the step of outputting, from a server, non-image data comprising the same information about a current state of the video camera, which is controlled in said controlling step, not only to the client which has issued the designation of a change in a pick-up direction of the video camera, but also to other clients coupled to the server, wherein the non-image data includes information about a current pickup direction of the video camera.

16. A method according to claim 13, further comprising the step of outputting, from a server, non-image data comprising the same information about a current state of the video camera, which is controlled in said controlling step, not only to the client which has issued the designation of a change in a pick-up direction of the video camera, but also to other clients coupled to the server, wherein the non-image data includes information about a current zoom state of the video camera.

* * * * *

UNITED STATES PATENT AND TRADEMARK OFFICE
CERTIFICATE OF CORRECTION

PATENT NO. : 6,611,285 B1
DATED : August 26, 2003
INVENTOR(S) : Kenji Morita

It is certified that error appears in the above-identified patent and that said Letters Patent is hereby corrected as shown below:

<u>Column 6,</u>
Line 54, "Icon" should read -- icon --.

<u>Column 17,</u>
Line 17, "are" should read -- and are --; "on" should read -- in --; and "Drawings" should read -- drawings --.
Line 25, "arraingements" should read -- arrangements --.

Signed and Sealed this

Third Day of February, 2004

JON W. DUDAS
*Acting Director of the United States Patent and Trademark Office*